US012709698B2

(12) United States Patent
Vaughn et al.

(10) Patent No.: US 12,709,698 B2

(45) Date of Patent: Aug. 18, 2026

(54) CURABLE POLYMERIC COMPOSITIONS

(71) Applicant: POLY-MED, INC., Anderson, SC (US)

(72) Inventors: Michael Aaron Vaughn, Anderson, SC (US); Prabhjot Saini, Greenville, SC (US); Mathew Stanford, Greenville, SC (US); Hafiz Busari, Greenville, SC (US); Debra Tindall, Easley, SC (US)

(73) Assignee: POLY-MED, INC., Anderson, SC (US)

( * ) Notice: Subject to any disclaimer, the term of this patent is extended or adjusted under 35 U.S.C. 154(b) by 357 days.

(21) Appl. No.: 17/766,729

(22) PCT Filed: Oct. 8, 2020

(86) PCT No.: PCT/US2020/054839

§ 371 (c)(1),
(2) Date: Apr. 5, 2022

(87) PCT Pub. No.: WO2021/072118

PCT Pub. Date: Apr. 15, 2021

(65) Prior Publication Data

US 2023/0183408 A1 Jun. 15, 2023

Related U.S. Application Data

(60) Provisional application No. 62/913,063, filed on Oct. 9, 2019.

(51) Int. Cl.

| | |
|---|---|
| ***C09D 187/00*** | (2006.01) |
| ***B29C 64/129*** | (2017.01) |
| ***B29C 64/30*** | (2017.01) |
| ***B29K 33/00*** | (2006.01) |
| ***B29K 67/00*** | (2006.01) |
| ***B29K 69/00*** | (2006.01) |
| ***B29K 81/00*** | (2006.01) |
| ***B33Y 10/00*** | (2015.01) |
| ***B33Y 40/20*** | (2020.01) |
| ***B33Y 70/00*** | (2020.01) |
| ***C08F 283/00*** | (2006.01) |
| ***C08G 81/00*** | (2006.01) |

(52) U.S. Cl.

CPC ........ *C09D 187/005* (2013.01); *B29C 64/129* (2017.08); *B29C 64/30* (2017.08); *B33Y 40/20* (2020.01); *B33Y 70/00* (2014.12); *C08F 283/00* (2013.01); *C08G 81/00* (2013.01); *B29K 2033/08* (2013.01); *B29K 2067/00* (2013.01); *B29K 2069/00* (2013.01); *B29K 2081/04* (2013.01); *B29K 2995/006* (2013.01); *B33Y 10/00* (2014.12)

(58) Field of Classification Search

CPC . C09D 187/005; C09D 11/101; B29C 64/129; B29C 64/30; B29C 64/124; B29C 64/314; B33Y 40/20; B33Y 70/00; B33Y 10/00; B33Y 80/00; B33Y 40/10; C08F 283/00; C08G 81/00; C08G 81/024; B29K 2033/08; B29K 2067/00; B29K 2069/00; B29K 2081/04; B29K 2995/0056; B29K 2995/006

See application file for complete search history.

(56) References Cited

U.S. PATENT DOCUMENTS

| | | | |
|---|---|---|---|
| 4,391,686 | A | 7/1983 | Miller et al. |
| 2005/0149158 | A1 | 7/2005 | Hunter et al. |
| 2006/0240063 | A9 | 10/2006 | Hunter et al. |
| 2007/0205528 | A1 | 9/2007 | Patel et al. |
| 2014/0099449 | A1 | 4/2014 | Tielemans et al. |
| 2016/0369096 | A1 | 12/2016 | Rolland et al. |
| 2016/0376453 | A1 | 12/2016 | Hearon |
| 2017/0022414 | A1 | 1/2017 | Boogaerts et al. |
| 2017/0096582 | A1 | 4/2017 | Tielemans et al. |
| 2017/0183453 | A1 | 6/2017 | Teasdale et al. |
| 2017/0291357 | A1 | 10/2017 | Fong et al. |
| 2017/0306118 | A1 | 10/2017 | Feichtenschlager et al. |
| 2018/0361660 | A1 | 12/2018 | Chen et al. |

FOREIGN PATENT DOCUMENTS

| | | | |
|---|---|---|---|
| CN | 106459368 | A | 2/2017 |
| CN | 109232839 | A | 1/2019 |
| EP | 1727663 | B1 | 10/2011 |
| EP | 2878613 | A1 | 6/2015 |
| WO | 2007031505 | A1 | 3/2007 |
| WO | 2013052328 | A1 | 4/2013 |
| WO | 2015164524 | A1 | 10/2015 |
| WO | 2016130573 | A2 | 8/2016 |

(Continued)

OTHER PUBLICATIONS

International Search Report and Written Opinion dated Feb. 25, 2021, for Application No. PCT/US2020/054839.

TCI America, "TCI-P0886" Jul. 6, 2018, <https://www.spectrumchemical.com/MSDS-TCI-P0886.pdf>, pp. 1, pp. 3.

Extended European Search Report for European Application No. 20874483.9, dated Dec. 1, 2023, 15 Pages.

International Preliminary Report on Patentability for International Application No. PCT/US2020/054839, dated Apr. 21, 2022, 09 Pages.

*Primary Examiner* — Jessica M Roswell

(74) *Attorney, Agent, or Firm* — Meunier Carlin & Curfman LLC

(57) ABSTRACT

Compounds and compositions are provided which are useful in additive printing, particularly additive printing techniques such as stereolithography (SLA), wherein a composition of one or more photocurable compounds, such as a compound with multiple ethylenically unsaturated groups and a compound with multiple thiol groups, is photopolymerized, optionally in the presence of two or more thermocurable compounds which are reactive with one another and are subjected to thermopolymerization, to form a manufactured article in solid form.

16 Claims, 2 Drawing Sheets

(56) References Cited

FOREIGN PATENT DOCUMENTS

| | | | |
|---|---|---|---|
| WO | 2017079158 | A1 | 5/2017 |
| WO | 2017112571 | A1 | 6/2017 |
| WO | 2019195763 | A1 | 10/2019 |
| WO | 2019224699 | A1 | 11/2019 |
| WO | 2020016343 | A2 | 1/2020 |
| WO | 2021016481 | A1 | 1/2021 |

CURABLE POLYMERIC COMPOSITIONS

CROSS-REFERENCE TO RELATED APPLICATION

This application is a national phase application under 35 U.S.C. § 371 of International Application No. PCT/US2020/054839, filed Oct. 8, 2020, which claims the benefit under 35 U.S.C. § 119 (e) of U.S. Provisional Patent Application No. 62/913,063 filed Oct. 9, 2019, which is applications are incorporated herein by reference in their entirety for all purposes.

FIELD OF THE DISCLOSURE

The present disclosure relates generally to the preparation and use of curable compositions, such as photocurable and thermocurable compositions to prepare bioabsorbable implants by an additive manufacturing process.

BACKGROUND

Stereolithography (SLA) is a relatively well-developed additive printing technique for preparing three-dimensional (3-D) objects. In stereolithographic methods, light, such as ultraviolet (UV) or visible light, is used to photopolymerize liquid material into designed structures, such as three-dimensional articles, with high accuracy and precision. Thin successive layers are photopolymerized by UV or visible light, for example, under the direction of a sliced CAD (computer aided design) model.

SLA generally uses a liquid photopolymerizable composition that may be referred to as a resin or an ink formulation. The macroscopic properties and degradation profiles of articles produced by SLA depend in part on the polymer chemistry and the processing techniques.

The present disclosure provides compounds and compositions useful in a curing process such as stereolithography (SLA), which have advantages over currently known compounds and compositions for this purpose.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

SUMMARY

In brief, in one aspect, the present disclosure provides compounds and compositions useful in a curing process, such as a photocuring process or such as a thermocuring process that is used in conjunction with a photocuring process. The curing process is useful in manufacturing articles, such as medical devices and coatings. An exemplary curing process is stereolithography (SLA), which is an additive manufacturing process wherein a curable composition according to the present disclosure containing one or more photoreactive compounds, including e.g., a photoreactive macromer, is photopolymerized (photocured) during a process to form a manufactured article. Another exemplary process is a coating process whereby a compound and/or composition of the present disclosure is placed on a surface and then cured by exposure to heat (thermocuring) and/or by exposure to actinic radiation (i.e., photopolymerized or photocured) to provide a solid coating on the surface. These cured products, i.e., products formed by curing a composition as disclosed herein, may generally be referred to herein as articles, coatings, films, materials and the like. Thus, when the present disclosure is exemplified by preparing an article, it should be understood that a coating or other material can likewise be prepared. In one aspect, the articles, coatings etc. are biodegradable.

In one aspect the present disclosure provides biodegradable polymeric materials formed by a curing process. The materials may be used to produce articles that have a limited lifetime, such that after some period of time, the article formed from the biodegradable material is no longer present. For example, the material may be a coating on a device, such as a medical device, where the coating degrades after some period of time. In another example, the material may be a used to prepare a medical device, for example, a mesh for tissue repair, so that after a time, some or none of the article is present and tissue repair is accomplished. As another example, the medical device may be a tissue adhesive or sealant, where a polymerizable composition of the present disclosure may be applied to a tissue in need of adhesive or sealant, and then that composition is exposed to actinic radiation sufficient to cause photopolymerization of the composition on the tissue.

According to the present disclosure, in one aspect stereolithography may be used to prepare such materials and articles, using, e.g., compounds and compositions as disclosed herein. The present disclosure addresses concerns about thermo- and photocured materials, such as SLA-produced articles, that come into contact with living entities, include concerns regarding the safety and efficacy of the produced articles, particularly their biocompatibility and cytotoxicity.

In one aspect, the present disclosure provides for the preparation and use of polymeric compositions. The polymeric composition may include or be made from a photopolymerizable polymer comprising a homopolymer, copolymer, block copolymer, random copolymer, random block copolymer, or combinations thereof. The polymeric composition may include or be made from a thermally curable polymer comprising a homopolymer, copolymer, block copolymer, random copolymer, random block copolymer, or combinations thereof. In one aspect, the polymeric composition is a double network, in that two chemically distinct polymers are present in admixture in the composition, where optionally the double network polymeric composition may be characterized as being a solid. In one aspect, the polymeric composition is a single network, in that a single polymer is present in the composition, where optionally the single network polymeric composition may be characterized as being a solid. In one aspect, the single network includes a crosslinked polymer. In one aspect, the double network includes a crosslinked polymer. The polymeric compositions may be used, e.g., to prepare bioabsorbable implants by an additive manufacturing process.

In one aspect, the present disclosure provides a composition comprising (1) a compound having multiple photopolymerizable groups, referred to herein as a polyhv, and (2) a mixture of two compounds that are thermally reactive with one another (thermocurable) so as to form a polymer, where the two compounds may be referred to herein as polyΔ1 and polyΔ2 or collectively as polyA (i.e., polyA refers to a mixture of polyΔ1 and polyΔ2). In one aspect, the composition additionally comprises a photoinitiator. In one aspect, the composition additionally comprises a stabilizer. In one aspect, the present disclosure provides a cured, and optionally crosslinked, composition resulting from the photopolymerization of a composition comprising a photoinitiator, a polyhv and a polyΔ, where this cured (e.g., crosslinked) composition may be said to have a single network, which refers to the network formed from polyhv reacting with itself. In one aspect, the present disclosure provides a double network composition resulting from the photopolymerization of polyhv, and the thermal polymerization of polyΔ1 with polyΔ2, where each of polyhv and polyA forms an independent network, one or both optionally being a crosslinked network. The two independent networks together form an interpenetrating double network. The double network is thus formed by thermocuring and photocuring a composition having both thermoreactive components (polyΔ1 and polyΔ2) and at least one photoreactive component (polyhv). In one aspect, photocuring precedes thermocuring. In one aspect, thermocuring precedes photocuring.

In one aspect, the present disclosure provides a composition comprising 1) a compound having multiple photopolymerizable thiol groups, referred to herein as a polySH, and 2) a compound having multiple photopolymerizable ethylenically unsaturated groups, referred to herein as a polyEU, where polySH and polyEU are photoreactive with one another. In one aspect, the composition additionally comprises a photoinitiator. In one aspect, the composition additionally comprises a stabilizer. In one aspect, the present disclosure provides a single network polymeric composition resulting from the photocuring (photopolymerization) of a composition comprising a photoinitiator, a polySH and a polyEU. In one aspect, the present disclosure provides a single network crosslinked composition resulting from the photocuring (photopolymerization) of a composition comprising a photoinitiator, a polySH and a polyEU. In another aspect, the present disclosure provides a single network crosslinked composition resulting from the photocuring (photopolymerization) of a composition comprising a photoinitiator, a stabilizer, a polySH and a polyEU. Exemplary EU groups are acrylate, methacrylate and norbornenyl, where polyEU refers to a compound comprising multiple EU groups, optionally two EU groups, or three EU groups, or four EU groups.

In one aspect, disclosed herein are methods and compositions for curing processes, such as 3-D printing, and for making and using the resulting cured articles. For example, the present disclosure provides a method for photopolymerization printing an article comprising, a) exposing for a time to light of suitable wavelength, a photopolymerizable composition comprising a polyEU macromer and a polySH as disclosed herein; optionally in combination with one or more other components such as at least one photoinitiator component and/or at least one light reflective material component comprising a light reflective material suspended in the composition, and/or at least one stabilizer; and forming a printed article comprising a polymerization product of the photopolymerizable composition. In another aspect, the present disclosure provides a method for photopolymerization printing an article comprising, a) exposing for a time to light of suitable wavelength, a photopolymerizable composition comprising a polyhv, polyΔ1, and polyΔ2; and b) thermally polymerizing the polyΔ1 with polyΔ2; optionally in combination with one or more other components such as at least one photoinitiator component and/or at least one light reflective material component comprising a light reflective material suspended in the composition, and/or at least one stabilizer; and forming a printed article comprising a polymerization product of the photopolymerizable composition.

In one aspect, disclosed herein are methods and compositions for photopolymerization processes, such as a film-forming process including a coating process, and for making and using such photopolymerized materials. For example, the present disclosure provides a method for photopolymerization coating of an article comprising, a) applying a photopolymerizable composition of the present disclosure to a surface, b) exposing for a time to light of suitable wavelength, the photopolymerizable composition comprising polyEU and polySH as disclosed herein; optionally in combination with one or more other components such as at least one photoinitiator component and/or at least one light reflective material component comprising a light reflective material suspended in the composition, and/or at least one stabilizer; and forming a solid coating comprising a polymerization product of the photopolymerizable composition.

In other aspects, the present disclosure provides the polymerization product of a macromer (which may also be referred to as a prepolymer) where the macromer has been polymerized by, e.g., one or more methods disclosed herein. In addition, the present disclosure provides an article, which may be referred to as a polymeric article, produced from a photopolymerizable compound or composition as disclosed herein, optionally by one or more methods as disclosed herein. The photopolymerized macromer or article may be a nontoxic article. In addition, the article may comprise biodegradable photopolymerized macromer, optionally in admixture with a nontoxic amount of photoinitiator. Optionally, the article may comprise biodegradable photopolymerized macromer, optionally in admixture with a nontoxic amount of stabilizer. Optionally, the article may comprise biodegradable photopolymerized macromer, optionally in admixture with a nontoxic amount of UV reflective material. In one aspect, the polymeric article is biodegradable, in whole or in part, under physiological conditions. However, in an alternative aspect, the polymeric article is not biodegradable under physiological conditions.

In addition, the present disclosure provides a photopolymerizable compound, also referred to herein as a macromer, comprising a polyaxial central core (CC) and 2-4 arms of the formula (A)-(B) or (B)-(A) extending from the central core, where at least one of the arms comprise a light-reactive functional group (Q) and (A) is the polymerization product of monomers selected from trimethylene carbonate (also referred to herein as T, or as TMC) and ε-caprolactone (also referred to herein as caprolactone, or C, or CAP), while (B) is the polymerization product of monomers selected from glycolide, lactide and p-dioxanone. The macromer may be a photopolymerizable macromer component in compositions and methods as disclosed herein, and may be photopolymerized to provide articles.

Optionally, any of the compositions of the present disclosure, before they are cured, may contain an effective amount of a photoinitiator, i.e., an amount of photoinitiator which is effective to achieve polymerization of the photopolymerizable compound when the composition is exposed to radiation emitted from a light source that delivers light of a selected wavelength suitable to activate the photoinitiator.

In one aspect, the present disclosure provides a method of 3D-printing, also known as additive printing, e.g., stereolithography, which comprises providing a polymerizable composition as disclosed herein having a photopolymerizable compound and a photoinitiator, and exposing that composition to light which is effective to activate the photoinitiator, in order to photopolymerize the photopolymerizable compound in the polymerizable composition. In one aspect, the composition is selectively exposed to the light, so that a selected portion of, and not all of, the composition undergoes a photopolymerization. In one aspect, the photopolymerizable compound is a mixture including one or more polyhv compounds, e.g., two photopolymerizable compounds denoted herein as polyEU and polySH. In one aspect, one or more photopolymerizable compounds is admixed with one or more thermally reactive compounds, e.g., two thermally reactive compounds denoted herein as polyΔ1 and polyΔ2.

The above-mentioned and additional features of the present disclosure and the manner of obtaining them will become apparent, and the disclosure will be best understood by reference to the following more detailed description. All references disclosed herein are hereby incorporated by reference in their entirety as if each was incorporated individually.

This Brief Summary has been provided to introduce certain concepts in a simplified form that are further described in detail below in the Detailed Description. Except where otherwise expressly stated, this Brief Summary is not intended to identify key or essential features of the claimed subject matter, nor is it intended to limit the scope of the claimed subject matter.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments. Other features, objects and advantages will be apparent from the description, the drawings, and the claims.

The above-mentioned and additional features of the present disclosure and the manner of obtaining them will become apparent, and the disclosure will be best understood by reference to the following more detailed description. All references disclosed herein are hereby incorporated by reference in their entirety as if each was incorporated individually.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION OF THE DISCLOSURE

Figure 1:
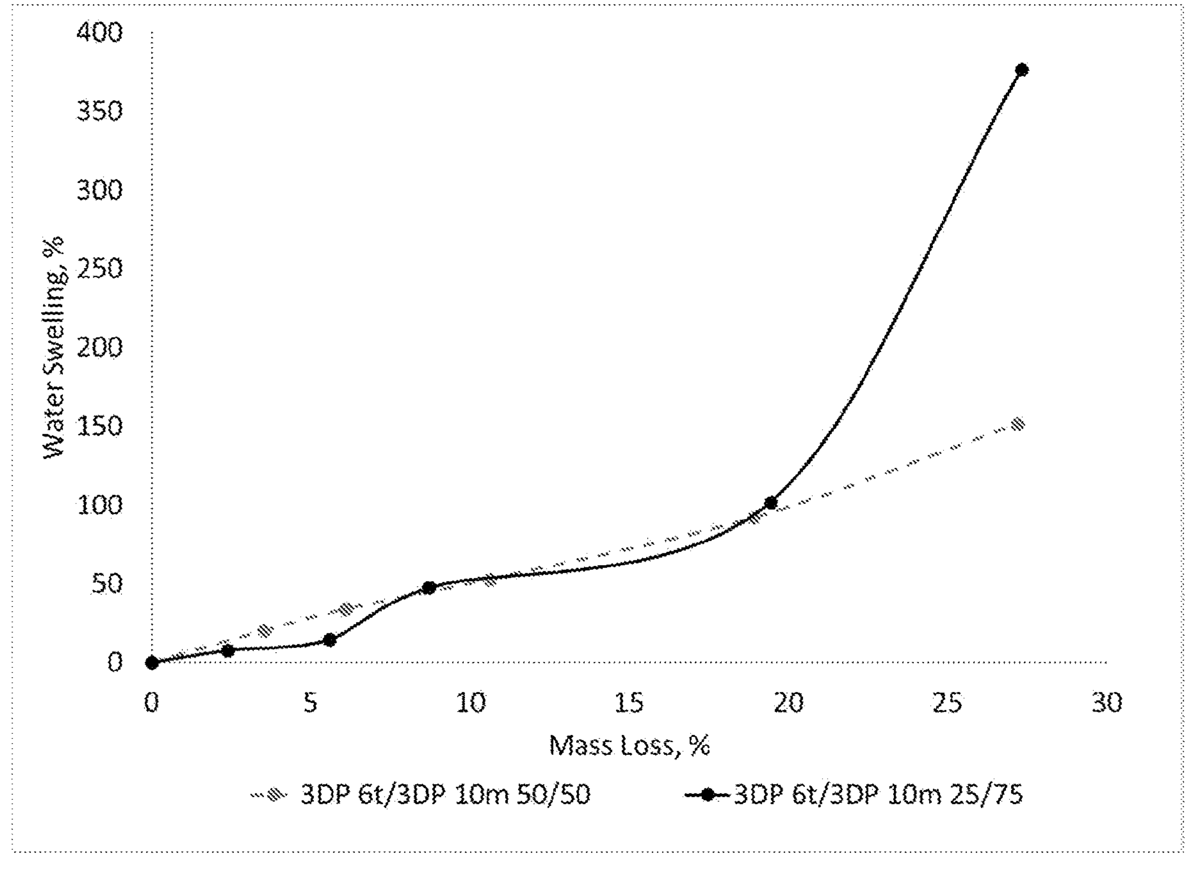
FIG. 1 shows degradation profiles for selected cured compositions of the present disclosure.

The present disclosure may be understood more readily by reference to the following detailed description of preferred embodiments of the disclosure and the Examples included herein. In reading this detailed description, and unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. The term "comprises" means "includes." The abbreviation, "e.g." is derived from the Latin exempli gratia, and is used herein to indicate a non-limiting example. Thus, the abbreviation "e.g." is synonymous with the term "for example."

In one aspect, the present disclosure provides compositions which are liquid at a temperature of about room temperature, i.e., about 18° C. to about 23° C., and which can undergo curing. The curing process will include photocuring, also referred to herein as photopolymerization, and depending on the composition, may also include thermocuring, also referred to herein as thermopolymerization. Photocuring occurs when the composition is exposed to actinic radiation of selected energy for a selected period of time, to cause reaction between the photochemical (also referred to herein as photoreactive or photopolymerizable or the like) components of the composition, and an increase in the average molecular weight of components in the composition. Thermocuring is the corresponding process achieved when the composition is heated above room temperature to a suitable temperature for a suitable length of time, to cause reaction between the thermally reactive (also referred to herein as thermoreactive or thermopolymerizable or the like) components of the composition, and increase the average molecular weight of components in the composition. When the reactants include compounds having three or more photoreactive or thermoreactive chemical groups, then the curing process will provide for a composition having crosslinked components. As used herein, curing refers to photocuring, optionally with thermocuring if the composition has thermally reactive components.

Compositions of the present disclosure include photoreactive components. Optionally, the compositions may also include thermally reactive components. When a composition includes both thermally and photochemically reactive components, the resulting cured composition may be referred to herein as having a double network or a dual network: a first network formed from the photochemically reactive compounds and a second network formed from the thermally reactive compounds. When a composition has photochemically reactive components but not thermally reactive components, the resulting cured composition may be referred to herein as having a single network.

As explained in further detail below, compositions of the present disclosure may comprise one or more compounds having at least two photochemically reactive functional groups, denoted "hv" groups, and may optionally include two or more compounds having at least two thermally reactive functional groups, denoted as "Δ" groups. The reactive functional groups will be joined to an organic backbone, i.e., a backbone made from atoms including carbon and hydrogen. As a simple example, if the A group is hydroxyl, a thermally reactive compound may be ethylene glycol, i.e., HO—$CH_2$—$CH_2$—OH, where the backbone is —$CH_2$—$CH_2$—.

When the backbone of a compound includes repeating chemical units, the compound may be referred to herein as a macromer. For example, a reaction between a minor amount of ethylene glycol (referred to as an initiator) and a major amount of a hydroxyl acid or equivalent, e.g., lactic acid or lactide, will result in a compound having two polylactides (repeating lactide units) extending from either end of the ethylene glycol initiator, and also having a hydroxyl group at each of the two termini of the polylactide chains. In one aspect, compositions of the present disclosure include a macromer as the photochemically reactive component, and/or a macromer as the thermally reactive component.

Compounds having two or more hydroxyl groups are exemplary thermally reactive compounds of the present disclosure. Such hydroxyl-containing compounds are thermally reactive with compounds having complementary functional groups, such as epoxide or isocyanate groups. Thus, a composition of the present disclosure may have a first compound with two or more hydroxyl groups and a second compound with two or more functional groups that are thermally reactive with hydroxyl groups. In one aspect, the hydroxyl group is an example of a nucleophilic group, and the epoxide is an example of an electrophilic group. Thus, in one aspect, a thermally reactive composition of the present disclosure may be described as having a compound with two or more nucleophilic groups and a compound having two or more electrophilic groups.

In addition to being compounds that are useful in thermally curable compositions as disclosed herein, hydroxyl-containing compounds are also useful starting materials for preparing photoreactive compounds. For example, as disclosed herein, hydroxyl groups may be converted to thiol-containing groups. In addition, hydroxyl groups may be converted to groups having an ethylenically unsaturated portion. Thus, the backbones of the hydroxyl-containing compounds as disclosed herein may also be present as the backbone, or a portion of the backbone, of a photochemically reactive compound in the compositions disclosed herein. It should be understood that when the present disclosure provides a compound having two or more hydroxyl groups, the present disclosure simultaneously provides that the backbone of that hydroxyl-containing compound is optionally present in a photochemically reactive compound of the present disclosure.

PolyΔ Compounds

In one aspect, the present disclosure provides compositions that include two polyA compounds denoted herein as polyΔ1 and polyΔ2. The compound polyΔ1 has multiple (hence the term "poly") Δ1 groups, where a Δ1 group is thermally reactive with a Δ2 group. The compound polyΔ2 has multiple Δ2 groups, where a Δ2 group is thermally reactive with a Δ1 group. Each of polyΔ1 and polyΔ2 is an organic compound. The term "thermally reactive" means that heat must be applied to a composition comprising polyΔ1 and polyΔ2 in order for Δ1 and Δ2 to react with one another. At room temperature, i.e., about 22° C., and in the absence of a catalyst, Δ1 and Δ2 do not react to any appreciable extent with one another. In one embodiment, the compositions of the present disclosure do not include a catalyst to increase the rate of a thermal reaction. Upon reaction, Δ1 and Δ2 form one or more covalent bonds so that polyΔ1 and polyΔ2 become part of a polymeric network, optionally a crosslinked polymeric network.

In one aspect, a polyhydric compound (also referred to as a polyol) is a polyA compound. For example, an aliphatic polyol having an alkylene group may be used as a polyΔ. Exemplary alkylene groups include ethylene, propylene (branched or straight chain), butylene (branched or straight chain), hexylene (branched, straight chain or cyclic) and octylene (branched, straight chain, or cyclic). Exemplary polyols having more than two hydroxyl groups, which may be used when crosslinking is desired, include trimethylolpropane, glycerol, pentaerythritol, 1,2,4-butanetriol, and 2,3,4-pentanetriol.

In one aspect, an aromatic diol may be used as a polyΔ. Examples include catechol, resorcinol, hydroquinone and the reactions products thereof, for example, the reaction product of reaction products of resorcinol and ethylene carbonate. Other suitable aromatic diols include bisphenol A and 4,4'-dihydroxybiphenyl.

In one aspect, a polyether diol may be used as a polyA compound. The polyether diol will introduce polyoxyalkylene segments, in other words polyether segments, into a cured composition. The polyether diol may comprise a homopolymer of oxyalkylene groups, or a copolymer of two different oxyalkylene groups. The copolymer may be a random or block copolymer, for example, a diblock copolymer, or a triblock copolymer. Exemplary oxyalkylene moieties include oxyethylene, oxypropylene, oxytrimethylene, and oxytetramethylene.

In one aspect, a polycarbonate diol may be used as a polyΔ. Examples include trimethylene carbonate, poly(hexamethylene carbonate) diol, poly(ethylene-carbonate) diol, poly(propylene-carbonate) diol, and poly(butylene-carbonate) diol.

An exemplary polyA macromer may have a polyaxial central core (CC) and 2-4 arms having repeating units. Such polyA macromers may be referred to herein as polyaxial macromers. In one embodiment, at least two of the arms terminate in a nucleophilic group, e.g., a hydroxyl group or an amine group. In one aspect, the repeating units are all the same, i.e., the arms are a homopolymer. In one aspect, the repeating units not all the same, i.e., the arms are a copolymer. The copolymer may be a random or block copolymer. For example, and as discussed further below, the arms may have the formula (A)-(B) or (B)-(A) extending from the central core. The arms may be biodegradable or non-biodegradable.

In one aspect, the arms include ester groups, and the arms may be said to be polyesters. In order to form an ester group, the arms may be prepared, in whole or in part, from hydroxy acids or equivalent. Exemplary hydroxy acids and equivalents include glycolic acid (and its equivalent, glycolide), lactic acid (and its equivalent, lactide), ε-caprolactone (C), and p-dioxanone. In one aspect, the arms are all formed from the same monomer, so that the polyaxial macromer has homopolymeric arms. In one aspect, the arms may include a carbonate group. In order to form a carbonate group, the arms may be prepared, in whole or in part, from trimethylene carbonate (also denoted herein as "T").

In one aspect, the polyA compound may be a polyaxial macromer having a central core and a plurality, e.g., 2-4, copolymeric arms extending from the central core, each arm ending (i.e., terminating) in a thermally reactive group, e.g., a hydroxyl group. The compound may be represented by the formula CC-[armΔ]$_n$ where CC represents the central core and n is selected from a number within the ranges of 2-18, or 2-14, or 2-8, or 2-6, or 2-4. Each arm is formed by the polymerization of monomers selected from two groups, the two groups being denoted as group A and group B. Thus, more specifically, in compounds of the present disclosure, CC-[armΔ]$_n$ may be written as either CC-[(A)p-(B)q-OH]n, or CC—[(B)q-(A)p-OH]n where each of (A)p-(B)q and (B)q-(A)p represents an arm. Optionally, the terminal functional group of the arm may be shown, where an exemplary terminal functional group is hydroxyl. In the formula, A represents the polymerization product of one or more monomers comprising, and optionally selected only from, trimethylene carbonate (T or TMC) and caprolactone (C or CAP), and p represents the number of monomers that have been polymerized to form the polymerization product A, where p is selected from 1-40, or 1-30, or 1-20, or 1-10. In the formula, B represents the polymerization product of one or more monomers comprising, and optionally selected only from, glycolide (G or GLY), lactide (L or LAC) and p-dioxanone (D or DOX), and q represents the number of monomers that have been polymerized to form the polymerization product B, where q is selected from 1-40, or 1-30, or 1-20, or 1-10.

For example, when compounds of the formula CC-[armΔ]$_n$ are formed from a trifunctional central core, and A is added to CC prior to the addition of B, then compounds of the formula CC-[armΔ]n may be written as CC-[(A)p-(B)q-OH]$_3$. If, in this example, A is formed by the polymerization of two Ts and one C, then p would be three and A would be selected from TTT, TTC, TCT, TCC, CCC, CCT, CTC, and CTT, independently within each arm. If, continuing with this example, B is formed by the polymerization of one G, then q would be one and B would be G. In this example, each arm would have a chemical formula selected from TTTG, TTCG, TCTG, TCCG, CCCG, CCTG, CTCG, and CTTG. This exemplary compound may be written as CC-[armΔ]$_3$ where each arm is independently selected from TTTG-OH, TTCG-OH, TCTG-OH, TCCG-OH, CCCG-OH, CCTG-OH, CTCG-OH, and CTTG-OH, or alternatively as either CC-[(T,T,C)-(G)-OH]$_3$ or CC-[(T,T,C)$_3$-(G)$_1$-OH]$_3$.

In one aspect, the present disclosure provides a composition comprising a compound having a bifunctional central core and 2 arms extending from the central core, each arm terminating in a hydroxyl group. In one embodiment, the present disclosure provides a composition comprising a compound comprising a trifunctional central core and either 2 or 3 arms extending from the central core, each arm terminating in a hydroxyl group. In one embodiment, the present disclosure provides a composition comprising a compound comprising a tetrafunctional central core and either 2 or 3 or 4 arms extending from the central core, each arm terminating in a hydroxyl group. Each arm in the compound may be a homopolymer or a copolymer, and when a copolymer, may be a random copolymer or a block copolymer, e.g., a block copolymer represented by the formula (A)-(B) or (B)-(A). When the compound is prepared by reacting the central core with monomers of Group A followed by reacting that reaction product with monomer(s) selected from Group B, then the compounds will have the formula CC-[(A)-(B)—OH]. However, when the composition is prepared by reacting the central core with monomers of Group B followed by reacting that reaction product with monomer(s) selected from Group A, then the compounds will have the formula CC—[(B)-(A)-OH].

In embodiments, the macromer will have a molecular weight of less than 250,000 Da, or less than 200,000 Da, or less than 150,000 Da, or less than 100,000 Da, or less than 50,000 Da, or less than 25,000 Da, or less than 20,000 Da, or less than 15,000 Da, or less than 10,000 Da, or less than 9,000 Da, or less than 8,000 Da, or less than 7,000 Da, or less than 6,000 Da, or less than 5,000 Da, or less than 1,000 Da.

In embodiments, the polyaxial macromers present in a composition all contain the same central core. For example, all of the macromer components of a composition are prepared from trimethylolpropane or pentaerythritol. However, in one aspect, a composition of the present disclosure contains a mixture of polyaxial macromer components, for example, some of the macromer components are triaxial, made from, e.g., trimethylolpropane, and other macromer components of the same composition are tetraaxial, made from, e.g., pentaerythritol.

In embodiments, the polyaxial macromers of the present disclosure have relatively short arms, e.g., 1-10 monomer residues/arm. A monomer residue, as used herein, refers to the polymerization product of the monomer, i.e., the structure that the monomer has after that monomer has been incorporated into a polymer and is thus providing a monomer residue in that polymer. In one embodiment, when the compounds of the disclosure are used in additive printing, those compounds should be in a fluid state: either the compounds themselves are fluid or the compounds are dissolved in a solvent and/or diluent to provide a fluid composition. If the arms are too long, a composition containing the compound will typically be too viscous to be useful in additive printing such as SLA, unless the composition contains a lot of solvent or diluent to dilute the compound, in which case the additive printing process may need to utilize an undesirably large amount of solvent. Advantageously, when the arms are relatively short, the compounds themselves may be fluid at the application temperature of the additive printing process. In an aspect the application temperature is room temperature, i.e., about 18° C. to about 23° C., and the composition is a liquid at this temperature.

In optional embodiments, the compounds and compositions of the present disclosure containing such compounds, can be described by one or more of the following features which characterize the A region (also referred to as a block) of the polyaxial macromer: have a block A which comprises residues formed from trimethylene carbonate (TMC or T), i.e., which are the polymerization product or residue of TMC; have a block A which comprises residues formed from caprolactone (CAP or C); have a block A which comprises residues formed from both TMC and CAP; at least 90% of the residues in block A are residues formed from TMC or CAP; the compound comprises 1-45, or 2-45 residues formed from TMC; the compound comprises 1-15 or 2-15 residues formed from TMC; the compound comprises 1-10 or 2-10 residues formed from TMC; region A has a molecular weight of from 102-2500 g/mol; region A has a molecular weight of 102-1000 g/mol; region A has a molecular weight of 102-900 g/mol; each A region comprises 2-45 monomer residues; each A region comprises 2-15 monomer residues; each A region comprises 2-10 monomer residues.

In optional embodiments, the compounds and compositions of the present disclosure containing such compounds, can be described by one or more of the following features which characterize the B block (also referred to as a region) of the polyaxial macromer: each B block comprise 1-45 or 2-45 monomer residues; each B block comprise 1-15 or 2-15 monomer residues; each B block comprises 1-10 or 2-10 monomer residues.

In one aspect, a polyamine is a polyA compound. For example, an aliphatic polyamine having an alkylene group may be used as polyΔ. Exemplary alkylene groups include ethylene, propylene (branched or straight chain), butylene (branched or straight chain), hexylene (branched, straight chain or cyclic) and octylene (branched, straight chain, or cyclic). Exemplary polyamines having more than two amine groups include polypropylenimine tetramine (also known as Dab-Am-4) and triethylenetetramine. The Huntsman Company sells many suitable polyamines having more than two amine groups, for example polyethertriamine (Huntsman product XTJ-566), JEFFAMINE© ST-404 polyetheramine (Huntsman product (XTJ-586), and JEFFAMINE© T-403 polyetheramine.

In one aspect, an aromatic diamine may be used as a polyΔ. Examples include 1,2-diaminobenzene, 1,3-diaminobenzene, 1,4-diaminobenzene, toluene diamine (e.g., 1,2-diamino-3-methylbenzene, 1,2-diamino-4-methylbenzene, 1,3-diamino-2-methylbenzene, 1,3-diaminoe-4-methylbenzene, 1,4-diamino-2-methylbenzene, 1,4-diamino-3-methylbenzene), alkyl-substituted toluenediamine (e.g., 3,5-diethyltoluene-2,4-diamine and 3,5-diethyltoluene-2,6-diamine), and p-xylyenediamine.

In one aspect, a polyether diamine may be used as a polyA compound. When a polyether diamine is reacted with a diisocyanate-containing polyΔ, the result will be a polyether urea moiety. The polyether diamine may comprise a homopolymer of oxyalkylene groups, or a copolymer of two different oxyalkylene groups. The copolymer may be a random or block copolymer, for example, a diblock copolymer, or a triblock copolymer. Exemplary oxyalkylene moieties include oxyethylene, oxypropylene, oxytrimethylene, and oxytetramethylene.

In one aspect, a polyisocyanate is a polyA compound. An exemplary polyisocyanate compound is an aliphatic polyisocyanate, such as, without limitation, tetramethylene diisocyanate, I-lysine diisocyanate, lysine ethyl ester diisocyanate, hexamethylene diisocyanate, octamethylene diisocyanate, decamethylene diisocyanate, dodecamethylene diisocyanate, and cyclohexane bis-(methylene isocyanate). Another exemplary polyisocyanate compound is an aromatic polyisocyanate, such as, without limitation, methylene 4,4,-diphenyl diisocyanate (MDI), 2,4-toluenediisocyanate (TDI), 1,5-naphthalene diisocyanate, and isophorone diisocyanate.

In one aspect, the polyisocyanate polyA is a macromer having multiple isocyanate groups. Such macromers may be referred to herein a polyisocyanate macromer. Polyisocyanate macromers may be prepared from the corresponding polyhydroxylated macromers by reaction of the polyhydroxylated macromer with a diisocyanate, e.g., hexamethylene diisocyanate.

Exemplary polyisocyanate macromers are the reaction product of reactants comprising or consisting of a diisocyanate and either or both of a diamine and a diol, e.g., a polyetherdiamine or a polyetherdiol. Such polyisocyanate macromers have terminal isocyanate groups which are reactive with additional polyamine and/or polyhydric compounds. For example, a diisocyanate may be used to form a macromer by reaction with either a diamine or a diol to provide a polyA compound (e.g., a polyΔ2 compound) having terminal isocyanate groups. This polyΔ2 polyisocyanate macromer may then be thermally reacted with additional diamine or diol (a polyΔ1 compound) to form a thermocured polymer in a composition of the present disclosure.

In one aspect the present disclosure provides a polyisocyanate macromer which is the reaction product of a polyisocyanate, e.g., a diisocyanate, and a polyol, e.g., a diol such as a polyetherdiol. Optionally, any one or more of the following may be used to further describe this polyisocyanate macromer and its preparation: the polyol is a diol and the polyisocyanate is a diisocyanate, the diol may be a polyetherdiol comprising at least one type of oxyalkylene sequence selected from the group consisting of oxyethylene, oxypropylene, oxytrimethylene and oxytetramethylene sequences; the polyol may be an aliphatic polyol having an alkylene group, where exemplary alkylene groups include ethylene, propylene (branched or straight chain), butylene (branched or straight chain), hexylene (branched, straight chain or cyclic) and octylene (branched, straight chain, or cyclic). Exemplary polyols having more than two hydroxyl groups, which may be used when crosslinking is desired, include trimethylolpropane, glycerol, pentaerythritol, 1,2,4-butanetriol, and 2,3,4-pentanetriol. The polyol may be an aromatic diol, where examples include catechol, resorcinol, hydroquinone and the reactions products thereof, for example, the reaction products of resorcinol and ethylene carbonate. Other suitable aromatic diols include bisphenol A and 4,4'-dihydroxybiphenyl.

In one aspect, a polyisocyanate macromer which is the reaction product of a polyisocyanate, e.g., a diisocyanate, and a polyol, e.g., a diol such as a polyetherdiol, provides a polyΔ2 compound which may be reacted with a polyΔ1 compound such as a polyamine. The reaction product may be described in terms of its structural components rather than in terms of the reactants by which it may be formed. In one aspect the polymer chain is a polyurea, having a plurality of urea groups separated alternately by aliphatic groups (contributed by the aliphatic diamine) and polymeric blocks (contributed by the macromer). In other words, the structure may be described by repeating -[urea-aliphatic-urea-polymer block]- units. The polymer block is a polyurethane, having a plurality of urethane (also known as carbamate) groups separated alternatively by aliphatic groups (contributed by the diisocyanate) and polyether groups. In other words, the structure of the polymer block may be described by repeating -[urethane-aliphatic-urethane-polyether]-units. The polyether segments may optionally be selected from oxyethylene, oxypropylene, oxytrimethylene and oxytetramethylene, and in one embodiment the polymer chain contains more than one of these polyether segments, for example, the polymer contains oxyethylene, oxypropylene and oxytetramethylene groups, where optionally the oxyethylene and oxypropylene are arranged in a block copolymer arrangement (e.g., oxyethylene block-oxypropylene block-oxyethylene block). The polymer block may also be referred to as a polyether polyurethane, and the polymer itself may be referred to as a poly ether urethane urea.

When the composition includes a polyisocyanate as a polyA compound, e.g., as polyΔ2, the composition will also include a compound that is reactive with a polyisocyanate, i.e., a polyΔ1 compound such as a polyhydric compound, where reaction of a polyisocyanate and a polyhydric compound create urethane groups. Another example of an isocyanate reactive group is an amine group, so that when a composition contains a polyisocyanate as polyΔ2, the composition may also include a polyamine compound as polyΔ1, where reaction of a polyisocyanate and a polyamine creates urea groups.

In one aspect, the polyA compound is a polyepoxide. Exemplary polyepoxides include, without limitation, a diepoxide, a triepoxide and a tetraepoxide. In one aspect polyΔ2 is a diepoxide. Exemplary polyepoxides include diepoxybutane (also known as butane diepoxide, butadiene diepoxide, or 1,2:3,4-diepoxybutane); 1,2,7,8-diepoxyoctane; 1,4-butanediol diglycidyl ether; polyglycerol polyglycidyl ether; ethylene glycol diglycidyl ether; polyethylene glycol diglycidyl ether with molecular weight of about 500 to about 6,000; and polypropylene glycol diglycidyl ether with molecular weight of about 500 to about 6,000.

The present disclosure provides polyA compounds wherein Δ is hydroxyl. Such compounds may be converted to polyA compounds wherein Δ is epoxy to provide polyepoxide compounds of the present disclosure. For instance, a polyhydroxyl compound may be reacted with an excess number of equivalents of epichlorohydrin, followed by treatment with base such as sodium hydroxide, to convert the hydroxyl groups to epoxy groups.

In an aspect, Δ1 is a nucleophilic group. In one embodiment, polyΔ1 has multiple hydroxyl (—OH) groups. In one embodiment, polyΔ1 has multiple amine groups (—$NH_2$). In an embodiment, polyΔ1 is not reactive with itself. In an embodiment, the only reactive groups present on polyΔ1 are the Δ1 groups, and all of the Δ1 groups are the same, e.g., they are all hydroxyl groups. In an embodiment, the polyΔ1 has two Δ1 groups. In an embodiment, the polyΔ1 has three Δ1 groups. In an embodiment, the polyΔ1 has four Δ1 groups. In an embodiment, the polyΔ1 has more than four Δ1 groups. All other factors being equal, the more Δ1 groups present as part of polyΔ1, the more crosslinking will occur from a composition comprising polyΔ1.

In one aspect, Δ2 is an electrophilic group. In one embodiment, polyΔ2 has multiple epoxide (—CH(O)CH—) groups. In one embodiment, polyΔ2 has multiple isocyanate (—N═C═O) groups. In an embodiment, polyΔ2 is not reactive with itself. In an embodiment, the only reactive groups present on polyΔ2 are the Δ2 groups, and all of the Δ2 groups are the same, e.g., they are all isocyanate groups. In an embodiment, the polyΔ2 has two Δ2 groups. In an embodiment, the polyΔ2 has three Δ2 groups. In an embodiment, the polyΔ2 has four Δ2 groups. In an embodiment, the polyΔ2 has more than four Δ2 groups. All other factors being equal, the more Δ2 groups present as part of polyΔ2, the more crosslinking will occur from a composition comprising polyΔ2.

In one aspect, polyΔ1 is a polyhydroxyl compound while polyΔ2 is a polyepoxide.

In one aspect, polyΔ1 is a polyhydroxyl compound while polyΔ2 is a polyisocyanate.

In one aspect, polyΔ1 is a polyamine compound while polyΔ2 is a polyepoxide.

In one aspect, polyΔ1 is a polyamine compound while polyΔ2 is a polyisocyanate.

In one aspect, polyΔ1 is a polythiol compound while polyΔ2 is a polyepoxide.

In one aspect, polyΔ1 is a polythiol compound while polyΔ2 is a polyisocyanate.

In one aspect, a composition of the present disclosure includes a photoinitiator.

Polyhv Compounds

Polyhv compounds of the present disclosure contain a plurality of photopolymerizable groups, hv. Exemplary photopolymerizable groups are ethylenically unsaturated groups, and an exemplary polyhv compound having ethylenically unsaturated groups may be denoted as polyEU. Another exemplary photopolymerizable group is a thiol group, and an exemplary polyhv compound having thiol groups may be denoted as polySH.

In one aspect, the present disclosure provides multi-arm compounds as described herein, wherein an arm terminates in a hv group, and that hv group is photopolymerizable. In one embodiment, exemplary hv groups may contain a thiol group which is photopolymerizable. In one embodiment, exemplary hv groups may contain a carbon-carbon double bond which is photopolymerizable, e.g., the arm may comprise a vinyl group such as present in an acrylate or methyacrylate group, each having a photopolymerizable carbon-carbon double bond.

The hv group containing a photopolymerizable component, e.g., a photopolymerizable thiol or carbon-carbon double bond, may be introduced into a multi-arm compound as described herein by reaction of the terminal hydroxyl group with a suitable reagent. Methods to convert a hydroxyl group to thiol-containing group or a carbon-carbon double bond containing group are generally known and may be utilized to prepare compounds of the present disclosure, where examples are provided herein.

While the hv group will contain a photoreactive group, and in particular a photoreactive group that allows for polymerization of the hv-containing macromer, the hv group may also contain additional atoms which influence the photoreactivity of the photoreactive group, e.g., a carbonyl group adjacent to the carbon-carbon double bond as illustrated herein, and/or which were used to introduce the photoreactive group to the macromer, e.g., a succinate ester may be used to introduce a thiol group, as illustrated herein.

For example, to convert a hydroxyl group to a hv group containing a photopolymerizable carbon-carbon double bond (polyEU), a multi-arm compound having a terminal hydroxyl group as described herein may be reacted with a reactive acrylate, methacrylate, or norbornenyl compound, such as methacrylic anhydride, acrylic anhydride, methyl-5-norbornene-2,3-dicarboxylic anhydride, 5-norbornene-2,3-dicarboxylic anhydride, methacryloyl chloride, or acryloyl chloride.

For example, to convert a hydroxyl group to a hv group containing a photopolymerizable thiol group (polySH), a multi-arm compound having a terminal hydroxyl group as disclosed herein may undergo an esterification reaction. One method for esterification is to add stoichiometric amounts of macromer and a mercapto carboxyl acid compound in the presence of a carbodiimide (e.g., N,N'-dicyclohexylcarbodiimide) and a catalyst (e.g., dimethylaminopyridine). Exemplary mercapto carboxyl acids include, but are not limited to, the following compounds: 3-mercaptopropionic acid, thiolactic acid, thioglycolic acid, mercaptobutyric acid, mercaptohexanoic acid, mercaptobenzoic acid, mercaptoundecanoic acid, mercaptooctanoic acid, and n-acetyl cysteine. For example, a multi-arm compound having a terminal hydroxyl group as disclosed herein may be reacted with thiolactic acid, in which case the resulting Q group has the formula —C(═O)—$CH_2$—SH attached to the terminal oxygen of the multi-arm compound.

Another exemplary method of forming thiol functionalized macromer (polySH) is to first modify a corresponding hydroxyl terminated macromer to form terminal carboxylic acid groups. One example of this is to react the hydroxyl terminated macromer with a succinic anhydride. With terminal carboxylic acid groups, the macromer can be reacted with mercapto alcohols by an esterification reaction or with mercapto amines to form amide bonds. Some examples of mercapto alcohols include, but are not limited to, the following: mercapto propanol, mercaptohexanol, mercaptooctanol, and mercapto undecanol. Some examples of mercapto amines include, but are not limited to, the following: cysteine, glutathione, 6-amino-1-hexanethiol hydrochloride, 8-amino-1-octanethiol hydrochloride, and 16-amino-1-hexadecanethiol hydrochloride. For example, a multi-arm compound having a terminal hydroxyl group as disclosed herein may be reacted with succinic anhydride to form an intermediate which is then reacted with cysteine to introduce a terminal thiol group, in which case the polySH compound includes a portion having the formula —C(═O)$CH_2CH_2$C(═O)NH—C(COOH)—$CH_2$SH attached to the terminal oxygen of the multi-arm compound.

Yet another method for forming thiol functionalized macromer polySH is to react a macromer having terminal hydroxyl groups with a lactone monomer having pendant thiol groups. This would occur in a third step ring opening polymerization.

In one aspect, the polySH compound is a macromer known as a thiomer. In some aspects, the thiol compound is a multi-arm poly(ethylene glycol) (PEG) comprising at least two free thiol groups or a multi-arm poly(ethylene oxide) comprising at least two free thiol groups. Exemplary thiomers include, without limitation, 4arm-PEG2K-SH, 4arm-PEGSK-SH, 4arm-PEG10K-SH, 4arm-PEG20K-SH, 4-arm poly(ethylene oxide) thiol-terminated, 8arm-PEG10K-SH (hexaglyerol core), 8arm-PEG10K-SH (tripentaerythritol core), 8arm-PEG20K-SH (hexaglyerol core), 8arm-PEG20K-SH (tripentaerythritol core), and 8-arm poly(ethylene oxide) thiol-terminated. These thiomers are available from Millipore Sigma (formerly Sigma Aldrich).

In one aspect, polySH is not a macromer, but is instead a small molecule having a molecular weight of less than 1000 daltons. Optionally, the small molecule polySH may be water soluble. Examples of such polySH compounds include dithiol compounds, trithiol compounds, and tetrathiol compounds. Exemplary polySH compounds include, without limitation, dithiothreitol (DTT); 1,2-ethanedithiol; 1,3-propanedithiol; 1,4-butanedithiol; 1,5-pentanedithiol; 1,6-hexanedithiol; 1,7-heptanedithiol; 1,8-octanedithiol; 1,9-nonanedithiol; 1,10-decanedithiol; 1,11-undecanedithiol; 1,12-dodecanedithiol; 1,13-tridecanedithiol; 1,14-tetradecanedithiol; 1,16-hexadecanedithiol; dithiolbutylamine (DTBA); tetra(ethylene glycol) dithiol; hexa(ethylene glycol) dithiol; 2-mercaptoethyl ether; 2,2'-thiodiethanethiol; 2,2'-(ethylenedioxy)diethanethiol; propane-1,2,3-trithiol; trimethylolpropane tris(2-mercaptoacetate); trimethylolpropane tris(3-mercaptoacetate); pentaerythrityl tetrathiol; pentaerythritol tetrakis(3-mercaptopropionate); 1,2-dithiane-4,5-diol; lipoic acid (alpha lipoic acid and beta lipoic acid); 3H-1,2-dithiole; 3-propyl-1,2-dithiolane; 3-acetyl-1,2-dithiolane; 1,2-dithiolane-4-carboxylic acid; 1,2-dithiolane-3-pentanol; 1,2,4-dithiazolidine; 1,2-dithiane; 1,2-dithiepane; 1,2-dithiocane; and 1,2-dithiocane-3,8-diol.

Photoinitiators

A photoinitiator refers to an organic (carbon-containing) molecule that creates reactive species when exposed to radiation. In one embodiment the photoinitiator creates a radical reactive species, as opposed to, e.g., a cationic or anionic reactive species. Photoinitiators are well known components for the preparation of photopolymers which find use in photo-curable coatings, adhesives and dental restoratives.

Type I photoinitiators are unimolecular free-radical generators; that is upon the absorption of UV-visible light a specific bond within the initiator's structure undergoes homolytic cleavage to produce free radicals. Homolytic cleavage is a bonding pair of electron's even scission into to free radical products. Examples of homolytic cleavage in several common classes of Type I photoinitiators: benzoin ethers, benzyl ketals, α-dialkoxy-aceto-phenones, α-hydroxy-alkyl-phenones, and acyl phosphine oxides. Exemplary commercially available Type I photoinitiators, available from, for example, BASF, BASF SE, Ludwigshafen, Germany, include, but are not limited to, Irgacure™ 369, Irgacure™ 379, Irgacure™ 907, Darocur™ 1173, Irgacure™ 184, Irgacure™2959, Darocur™ 4265, Irgacure™ 2022, Irgacure™ 500, Irgacure™ 819, Irgacure™ 819-DW, Irgacure™ 2100, Lucirin™ TPO, Lucirin™ TPO-L, Irgacure™ 651, Darocur™ BP, Irgacure™ 250, Irgacure™ 270, Irgacure™ 290, Irgacure™ 784, Darocur™ MBF, Ivocerin, hand Irgacure™ 754, lithium phenyl-2,4,6-trimethylbenzoylphosphinate, magnesium phenyl-2,4,6-trimethylbenzoylphosphinates, and sodium phenyl-2,4,6-trimethylbenzoylphosphinates Type II photoinitiators require a co-initiator, usually an alcohol or amine, functional groups that can readily have hydrogens abstracted, in addition to the photoinitiator. The absorption of UV-visible light by a Type-II photoinitiator causes an excited electron state in the photoinitiator that will abstract a hydrogen from the co-initiator, and in the process, splitting a bonding pair of electrons. Benzophenone, thioxanthones, and benzophenone-type photoinitiators are the most common Type II photoinitiators. Further examples of some common Type II photoinitiators include riboflavin, Eosin Y, fluorescein, rose Bengal, and camphorquinone. Once the free-radicals are generated, the polymerization mechanism is similar to any free-radical polymerization process.

Optionally, a composition of the present disclosure includes at least one photoinitiator component, typically in a total concentration of less than 2 wt %, or less than 1.5 wt %, or less than 1 wt %, or less than 0.9 wt %, or less than 0.8 wt %, or less than 0.7 wt %, or less than 0.6 wt %, or less than 0.5 wt %, or less than 0.25 wt %, or less than 0.1 wt % based on the total weight of photoreactive compounds.

Optional Ingredients

A composition of the present disclosure may contain an optional ingredient, such as one, two, or a plurality of optional ingredients. Exemplary optional ingredients are described herein.

In one aspect, a colorant, such as a dye, may be included in the compositions of the present disclosure, and the corresponding cured product. The addition of a dye can achieve the purpose of tailoring a formulation to a desired color. In one aspect, the dye is a non-toxic, biocompatible dye. Such dyes may be present at concentrations of about 2 wt. % or less based on the total weight of the composition. See, for example, PCT/US2016/059910, which is incorporated herein for its teaching of the use of dyes. In one embodiment, the dye is present at a concentration of about 0.1-0.3 wt %, which is the FDA-recommended amount for the dye D&C Violet when present in an absorbable suture products. In one embodiment, the dye is present at a concentration of less than 0.5 wt %. In some cases, the dye may impart toxicity to the photopolymerized composition of the present disclosure, if that dye is present at too high of a concentration.

In one aspect, a light reflective material component comprising a light reflective material may be suspended in the composition, where the light reflective material component modulates the light dose of the composition when compared to the light dose of the composition without the light reflective material. Suitable light reflective materials for optional inclusion in the compositions of the present disclosure are provided in U.S. Provisional Patent Application Ser. No. 62/653,584, entitled Methods and Compositions for Photopolymerizable Additive Manufacturing, filed Apr. 6, 2018 by Applicant Poly-Med, Inc., having inventors M. A. Vaughn and P. Saini, which is incorporated herein in its entirety.

A suitable light reflective material comprises light reflective material that reflects UV light, visible light or both. For example, a light reflective material may be or comprise a particulate light reflective material sized less than 500 microns, or sized less than 30 microns, or sized less than 5 microns, or sized less than 1 micron. A light reflective material may be shaped, for example, as a sphere, cube, cone, cuboid, cylinder, pyramid, prism, poly-hedron, or irregular shape, or mixtures thereof. In one aspect, a light reflective material has a smooth surface.

In an aspect, a light reflective material may comprise an inorganic solid including but not limited to titanium dioxide, zinc oxide, barium sulfate, tricalcium phosphate, dicalcium phosphate, monocalcium phosphate, dicalcium diphosphate, calcium triphosphate, hydroxyapatite, apatite, and tetracalcium phosphate. In an aspect, the light reflective material may comprise organic compounds comprising aliphatic polymers and copolymers including but not limited to polyesters, polyurethanes, polyethers, polyanhydrides, polyamides, polycarbonates, polyketones, polyethylene, polypropylene, polyvinyl alcohol, polytetrafluoroethylene, polyvinyl chloride, polyimides, and polyhydroxy alkanoates or combinations thereof. In an aspect, the light reflective material may comprise organic compounds comprising aromatic polymers and copolymers including but not limited to polyesters, polyurethanes, polyethers, polyanhydrides, polyketones, polyamides, polycarbonates, and polyimides or combinations. In an aspect, the light reflective material may comprise organic compounds comprising naturally derived polymers and derivatives including but not limited to cyclodextrins, starch, hyaluronic acid, deacetylated hyaluronic acid, chitosan, trehalose, cellobiose, maltotriose, maltohexaose, chitohexaose, agarose, chitin 50, amylose, glucans, heparin, xylan, pectin, galactan, glycosaminoglycans, dextran, aminated dextran, cellulose, hydroxyalkylcelluloses, carboxyalkylcelluloses, fucoidan, chondroitin sulfate, sulfate polysaccharides, mucopolysaccharides, gelatin, zein, collagen, alginic acid, agar, carrageean, guar gum, gum arabic, gum ghatti, gum karaya, gum konjak, gum tamarind, gum tara, gum tragacanth, locust bean gum, pectins, and xanthan gum. In an aspect, the light reflective material may comprise crystalline organic compounds comprising crystalline aliphatic and aromatic polymers. In an aspect, the light reflective material may comprise crystalline organic compounds comprising crystalline naturally derived polymers and derivatives. In an aspect, a light reflective material may comprise crystalline amino acids and their derivatives. In an aspect, a light reflective material may comprise crystalline fatty acids and their derivatives, including but not limited to palmitic acid, ascorbyl palmitate, lauric acid, glycerol monolaurate, myristic aid, and capric acid. In an aspect, a light reflective material may comprise crystalline peptides.

In one aspect, the compositions of the present disclosure may contain a diluent. The diluent may be reactive or non-reactive. A reactive diluent undergoes a photopolymerization reaction when exposed to light (UV or visible light) while a non-reactive diluent is inert to such light exposure. An exemplary reactive diluent is PEG-diacrylate (PEG-DA or PEGDA).

In one aspect, a bioactive agent may be included in a composition of the present disclosure, and the corresponding cured product. Examples of such bioactive agents include, but are not limited to, fibrosis-inducing agents, antifungal agents, antibacterial agents and antibiotics, anti-inflammatory agents, anti-scarring agents, immunosuppressive agents, immunostimulatory agents, antiseptics, anesthetics, antioxidants, cell/tissue growth promoting factors, anti-neoplastic, anticancer agents and agents that support ECM integration.

Examples of fibrosis-inducing agents include, but are not limited to talcum powder, metallic beryllium and oxides thereof, copper, silk, silica, crystalline silicates, talc, quartz dust, and ethanol; a component of extracellular matrix selected from fibronectin, collagen, fibrin, or fibrinogen; a polymer selected from the group consisting of polylysine, poly(ethylene-co-vinylacetate), chitosan, N-carboxybutyl-chitosan, and RGD proteins; vinyl chloride or a polymer of vinyl chloride; an adhesive selected from the group consisting of cyanoacrylates and crosslinked poly(ethylene glycol)-methylated collagen; an inflammatory cytokine (e.g., TGF$\beta$, PDGF, VEGF, bFGF, TNF$\alpha$, NGF, GM-CSF, IGF-a, IL-1, IL-1$\beta$, IL-8, IL-6, and growth hormone); connective tissue growth factor (CTGF); a bone morphogenic protein (BMP) (e.g., BMP-2, BMP-3, BMP-4, BMP-5, BMP-6, or BMP-7); leptin, and bleomycin or an analogue or derivative thereof. Optionally, the device may additionally comprise a proliferative agent that stimulates cellular proliferation. Examples of proliferative agents include: dexamethasone, isotretinoin (13-cis retinoic acid), 17-$\beta$-estradiol, estradiol, 1$\alpha$,25-dihydroxyvitamin $D_3$, diethylstibesterol, cyclosporine A, L-NAME, all-trans retinoic acid (ATRA), and analogues and derivatives thereof. See, e.g., US 2006/0240063, which is incorporated by reference in its entirety. Examples of antifungal agents include, but are not limited to, polyene antifungals, azole antifungal drugs, and Echinocandins. Examples of antibacterial agents and antibiotics include, but are not limited to, erythromycin, penicillins, cephalosporins, doxycycline, gentamicin, vancomycin, tobramycin, clindamycin, and mitomycin. Examples of anti-inflammatory agents include, but are not limited to, non-steriodal anti-inflammatory drugs such as ketorolac, naproxen, diclofenac sodium and fluribiprofen. Examples of anti-scarring agents include, but are not limited to cell-cycle inhibitors such as a taxane, immunomodulatory agents such as serolimus or biolimus (see, e.g., US 2005/0149158, which is incorporated by reference in its entirety). Examples of immunosuppressive agents include, but are not limited to, glucocorticoids, alkylating agents, antimetabolites, and drugs acting on immunophilins such as ciclosporin and tacrolimus. Examples of immunostimulatory agents include, but are not limited to, interleukins, interferon, cytokines, toll-like receptor (TLR) agonists, cytokine receptor agonist, CD40 agonist, Fc receptor agonist, CpG-containing immunostimulatory nucleic acid, complement receptor agonist, or an adjuvant. Examples of antiseptics include, but are not limited to, chlorhexidine and tibezonium iodide. Examples of anesthetic include, but are not limited to, lidocaine, mepivacaine, pyrrocaine, bupivacaine, prilocalne, and etidocaine. Examples of antioxidants include, but are not limited to, antioxidant vitamins, carotenoids, and flavonoids. Examples of cell growth promoting factors include, but are not limited to, epidermal growth factors, human platelet derived TGF-$\beta$, endothelial cell growth factors, thymocyte-activating factors, platelet derived growth factors, fibroblast growth factor, fibronectin or laminin. Examples of antineoplastic/anticancer agents include, but are not limited to, paclitaxel, carboplatin, miconazole, leflunamide, and ciprofloxacin. Examples of agents that support ECM integration include, but are not limited to, gentamicin The compositions and corresponding cured articles of the present disclosure may contain a mixture of bioactive agents in order to obtain a desired effect. Thus, for example, an antibacterial and an anti-inflammatory agent may be combined in a single article to provide combined effectiveness.

Other optional components of the photopolymerizable composition are a reactive diluent, a non-reactive diluent, a solvent, a stabilizer, a thixotropic material, a tracer material and a conductive material. The stabilizer, when present, may optionally be selected from the group consisting of tocopherol, gallic acid, ester of gallic acid, butylated hydroxyanisole and combinations thereof. By addition of the appropriate component, a photopolymerized composition (e.g., an article, or piece) of the present disclosure may be colored due to the presence of a dye, or may have any other desired attribute such as having at least a portion of the article that is, but is not limited to, fluorescent, radioactive, reflective, flexible, stiff, pliable, breakable, or a combination thereof.

In one aspect, a composition of the present disclosure comprising polyhv or a polyΔ is polymerized in the absence of water, e.g., water is not a diluent in the composition. Specifically, in one aspect, the composition which forms a single or double network, or the single or double network itself, has a moisture (water) content of less than 2500 ppm, or less than 1000 ppm, or less than 500 ppm of water. In one aspect, the photocurable composition of the present disclosure that provides a single network, is an anhydrous composition in that it does not contain more than adventitious water. In one aspect, the photocurable and thermocurable composition of the present disclosure that provides a double network, is an anhydrous composition in that it does not contain more than adventitious water. An anhydrous composition of the present disclosure is not, for example, a hydrogel.

One challenge to creating formulations with both ethylenically unsaturated compounds and thiol compounds is their tendency to polymerize upon mixing at room temperature prior to the application of stimuli such as light or heat. Therefore, this can greatly limit the application of these formulations as the working time where their viscosity is constant can be short. Specifically for additive manufacturing using vat photopolymerization, these formulations have issues with a changing viscosity over time. In the present disclosure, biocompatible stabilizers are outlined than may give stability for at least 24 hrs, which should be useful in addressing work time for vat photopolymerization. In an aspect, one or more stabilizer compounds may be included in a composition of the present disclosure, and the corresponding cured product.

In one embodiment, the composition of the poly(SH) or poly(EU) includes a stabilizer. The stabilizer may be included in the poly(SH), poly(EU) or a combination thereof. In one aspect, the stabilizer is an add-in component. In another aspect, the stabilizer is included as in add-in dissolved in a monomer, diluent, solvent, or combination thereof. In one aspect, the stabilizer is an anti-oxidant. In another aspect, the stabilizer is an acid. Preferably, the acid stabilizer has a pKa between 1 and 5. In another aspect, the stabilizer is selected from a phosphite and phosphonate compound. In another aspect, the stabilizer may include an anti-oxidant, acid, phosphite, phosphonate, and combinations thereof. Examples of anti-oxidant stabilizers include but are not limited to hydroquinone, mono-tertiary-butyl hydroquinone (MTBHQ), 2,5-di-tertiary-butyl-hydroquinone (DTBHQ), p-methoxyphenol, butylated hydroxytoluene (BHT), butylated hydroxyanisole (BHA), 2,6-di-tert-butyl-p-cresol, 2,2-methylene-bis-(4-methyl-6-tert-butyl) phenol (MBETBP), p-tert-butyl catechol, 1,3,5-trimethyl-2,4,6-tris(3,5-di-tert-butyl-4-hydroxybenzyl)benzene (Anox 330™, Irganox 1330™), hydroxytoluene butyl ether, tocopherol (all isomers), esters of tocopherol, pyrogallol, lauryl gallate, esters of gallic acid, or combinations thereof. Examples of acid stabilizers may include but are not limited to phosphonic acid, phosphorous acid, oxalic acid, succinic acid, gallic acid, ascorbic acid, phenyl phosphonic acid, or combinations thereof. Examples of phosphite and phosphonate stabilizers may include but are not limited to triphenyl phosphite, diphenyl isodecyl phosphite, diphenyl isooctylphosphite, or combinations thereof. In one aspect, the stabilizer is soluble in the poly(SH) and/or poly(EU) formulation. Preferably, the stabilizer is added in concentrations that achieve biocompatibility. Preferably, a biocompatible stabilizer comprises of tocopherol, gallic acid, ester of gallic acid, butylated hydroxyanisole, or combinations thereof. In one aspect, the stabilizer concentration is less than 100,000 ppm, more preferably less than 50,000 ppm, more preferably less than 15,000 ppm, more preferably less than 15,000 ppm, more preferably less than 5,000 ppm, more preferably less than 3,000 ppm and even more preferably less than 1,500 ppm.

Photopolymerization Reaction Conditions

The photopolymerizable compounds polyhv (including polyEU and polySH) as described herein having photopolymerizable groups, and the compositions of the present disclosure that include such compounds, will undergo polymerization upon sufficient exposure to light of appropriate wavelength, optionally in the presence of a photoinitiator, and further optionally in the presence of other components. The choice of appropriate wavelength, time of exposure, and curing agent identity and amount, is selected in view of identity and quantity of the hv group in the compounds and compositions, as is conventional in the art. Photopolymerization is sometimes referred to radiation curing, in which case the photoinitiator may be referred to as the curing agent.

In an aspect, a photoinitiator component in a composition of the present disclosure comprises a Type I photoinitiator. In an aspect, a photoinitiator component in a composition of the present disclosure comprise a Type II photoinitiator. In an aspect, a combination of a Type I and a Type II photoinitiator is present in photopolymerization composition of the present disclosure.

In any of the photopolymerizable compounds and composition as described herein, hv may be a carbon-carbon double bond, e.g., a vinyl group. Exemplary vinyl groups are an acrylate group and a methacrylate group. Another exemplary carbon-carbon double bond is present in norbornenyl. In additional aspects, the photopolymerizable compound having one or more hv groups undergoes photopolymerization when exposed to light having a wavelength of 300-450 nm, or 300-425 nm, or 350-450 nm, or 350-425 nm, or 365-405 nm, or 450-550 nm, as examples. In one embodiment, the polyhv compound and related composition undergoes photopolymerization when exposed to UV radiation.

In any of the photopolymerizable compounds and composition as described herein, hv may be a thiol group. In additional aspects, the photopolymerizable compound polySH having one or more SH groups undergoes photopolymerization when exposed to actinic radiation, for example, light having a wavelength of 300-450 nm, or 300-425 nm, or 350-450 nm, or 350-425 nm, or 365-405 nm, or 450-550 nm, as examples. In one embodiment, the polySH compound and related compositions undergoes photopolymerization when exposed to UV radiation. In one embodiment, the polySH compound and related compositions undergoes photopolymerization when exposed to visible radiation.

In one aspect, the present disclosure provides a composition comprising a compound having multiple photopolymerizable thiol groups and a compound having multiple photopolymerizable ethylenically unsaturated groups. The thiol groups and the ethylenically unsaturated groups are reactive with one another in the presence of a photoinitiator and upon exposure to suitable actinic radiation. The actinic radiation may alternatively be referred to as light, and the compositions may be referred to as light-reactive. This reaction may be referred to as photopolymerization or curing.

Suitable photoinitiators have been described elsewhere herein. In order for the photoinitiator to successfully cure the light-reactive composition, it is necessary that the absorption bands of the photoinitiator overlap with the emission spectrum of the light source used for curing. Optionally, photopolymerizable compositions disclosed herein comprise at least one photoinitiator that absorbs a wavelength of light in a range between about 10 nm to about 770 nm, or between about 100 nm to about 770 nm, or between about 200 nm to about 770 nm, and all wavelengths thereinbetween the stated range. In an aspect, a photoinitiator component comprises a photoinitiator that absorbs a wavelength of light of greater than or equal to 300 nm, up to about 770 nm. In an aspect, a photoinitiator component comprises a photoinitiator that absorbs a wavelength of light of greater than or equal to 365 nm, up to about 770 nm. In an aspect, a photoinitiator component comprises a photoinitiator that absorbs a wavelength of light of greater than or equal to 375 nm, up to about 770 nm. In an aspect, a photoinitiator component comprises a photoinitiator that absorbs a wavelength of light of greater than or equal to 400 nm, up to about 770 nm. The photopolymerization conditions of the present disclosure will include exposure of the light-reactive composition to a spectrum of wavelengths from an emission source that can and does provide the desired spectrum of wavelengths suitable for photopolymerization of the composition. Choice of wavelength will depend on the identity of the photoinitiator. Suppliers of commercially available photoinitiators indicate the appropriate wavelength for that particular photoinitiator.

Free radical generating photoinitiators may be used to achieve polymer curing according to the present disclosure. These photoinitiators may be used to cure a mixture of thiol-containing compounds and ethylenically unsaturated compounds such as disclosed herein. There are two types of free-radical generating photoinitiators, designated as Type I and Type II photoinitiators, which may be used according to the present disclosure, and which are described elsewhere herein.

Photopolymerizable compositions disclosed herein are made by combining the desired components, typically with stirring to achieve a homogeneous composition. The desired components may be mixed using a homogenizer. For example, a composition as disclosed herein may be prepared by combining ingredients such as those identified above. Optionally, the desired components may include a dispersion agent to aid in suspension. The listed components may optionally be heated prior to mixing. The listed components may optionally be placed under vacuum to remove gas bubbles.

In an aspect, the present disclosure provides a composition comprising a first organic compound (polySH) having multiple thiol groups (SH), a second organic compound (polyEU) having multiple ethylenically unsaturated groups (EU), and a photoinitiator. The relative amounts of polySH and polyEU in the composition may be described in terms of an SH to EU equivalents ratio of X:Y, where X represents the equivalents of SH, Y represents the equivalents of EU, and the total of X and Y is 100. In one aspect, X ranges from 25-75 and Y ranges from 75-25 and the sum of X and Y is 100. In one aspect, X ranges from 30 to 70 and Y ranges from 70 to 30 and the sum of X and Y is 100. In one aspect, X ranges from 40 to 60 and Y ranges from 60 to 40 and the sum of X and Y is 100. In one aspect, X ranges from 45 to 55 and Y ranges from 55 to 45 and the sum of X and Y is 100. In one aspect, the equivalents of X are approximately equal to the equivalents of Y.

Thermal Reaction Conditions

As discussed herein, compositions of the present disclosure may contain polyΔ1 and polyΔ2, which are reactive with one another upon exposure to elevated temperature. The specific elevated temperature, and the time necessary to achieve reaction between polyΔ1 and polyΔ2 at that specific elevated temperature, will depend on the specific identities of Δ1 and Δ2. For many reactions between a nucleophile and an electrophile, a temperature of about 100° C. for 30 minutes to 5 hours is sufficient.

In one aspect, the present disclosure provides a composition comprising a first organic compound (polyhv) having multiple photopolymerizable groups (hv), a photoinitiator, a second organic compound (polyΔ1) having multiple reactive groups Δ1, and a third organic compound (polyΔ2) having multiple reactive groups Δ2, where Δ1 reacts with Δ2 upon contact and exposure to a temperature of greater than about 50° C. The relative amounts of polyΔ1 and polyΔ2 in the composition may be described in terms of a Δ1 to Δ2 equivalents ratio of X:Y, where X represents the equivalents of Δ1, Y represents the equivalents of Δ2, and the total of X and Y is 100. In one aspect, X ranges from 25-75 and Y ranges from 75-25 and the sum of X and Y is 100. In one aspect, X ranges from 30 to 70 and Y ranges from 70 to 30 and the sum of X and Y is 100. In one aspect, X ranges from 40 to 60 and Y ranges from 60 to 40 and the sum of X and Y is 100. In one aspect, X ranges from 45 to 55 and Y ranges from 55 to 45 and the sum of X and Y is 100. In one aspect, the equivalents of X are approximately equal to the equivalents of Y.

In order to expose the composition to elevated temperature, the composition may be placed into an oven. Alternatively, a heat lamp may be directed to the composition, where the head lamp provides infrared radiation that will heat the composition.

Additive Manufacturing

Methods disclosed herein include methods for using curable compositions to make articles, particularly non-toxic and biodegradable articles. For example, a composition disclosed herein may be used as a curable ink or resin in 3-D printing methods. For example, a curable composition as disclosed herein may be used as curable ink or resin in vat polymerization process for 3-D printing. Exemplary vat polymerization processes include stereolithography (SLA, also known as SL), digital light processing (DLP™; Texas Instrument), daylight polymer printing (DPP), Carbon digital light synthesis (Carbon DLS™; Carbon, Inc.) and continuous liquid interface production (CLIP™; Carbon, Inc.). Other suitable methods of additive manufacturing an article using the curable compositions of the present disclosure include binder jetting, material jetting, material extrusion, computed axial lithography, and 2 photon polymerization printing. The present disclosure provides for the use of the curable compositions as disclosed herein in any of the mentioned 3D printing processes.

Thus, in one aspect, the present disclosure provides a method for vat polymerization, e.g., SLA printing an article, which comprises exposing for a time with light, a photopolymerizable composition comprising at least one photopolymerizable composition as disclosed herein including at least one photoinitiator component that is typically in a total concentration of less than 1.0 wt %. Any of the photopolymerizable compositions disclosed herein may be used in the method for SLA printing an article. For example, the composition may contain polyhv in addition to polyΔ1 and polyΔ2. As another example, the composition may contain polyEU and polySH. Optionally, the photopolymerizable composition may comprise a reactive diluent or a nonreactive diluent. A reactive diluent is a diluent that participates in the polymerization reaction, for example, the reactive diluent is polymerized with, for example, a macromer. A photopolymerizable composition of the present disclosure may comprise a stabilizer, for example, a free radical stabilizer.

A method for printing an article by SLA according to the present disclosure may comprise a secondary curing step comprising curing the printed article with thermal energy. A secondary curing step involves exposing at least a portion of the printed article to thermal energy so that at least a portion of the printed article undergoes a second, heat-induced polymerization reaction. For example, some or all of an article may be exposed to a temperature of about 100° C. for about 30 minutes to 5 hours. A secondary curing step may be used to change the properties of the printed article.

A method for printing an article by SLA according to the present disclosure may comprise pre- and/or post-treatments of a printed article. For example, the printed article may be rinsed after printing, before or after a thermal curing step.

A printed article is the article resulting after a 3-D printing period is completed. The printed article may be a structure or a portion of a structure. The printed article may be in the form of a film, such as a coating that is printed onto a surface. As used herein, the term printing is used to mean contacting a polymeric composition with a surface and causing the polymeric composition to further polymerize. Printing may involve contacting a polymeric composition with a surface that is then exposed to UV and/or visible light so that the polymeric composition undergoes further polymerization. The surface that the polymeric composition contacts may be any surface including a polymerized layer of the polymeric composition. As mentioned previously, the printed article may undergo a second curing step, by being exposed to elevated temperature.

A printed article may or may not contain residual amounts of components of a curable composition. For example, a printed article may comprise diluent or photopolymerized diluent, or photoinitiator. In an aspect, a printed article or a curable composition may have additives. Additives may include thixotropic materials, colorants, tracer materials or conductive materials. For example, an additive may be a dye. A printed article may be colored due to the presence of a dye, or may have any desired attribute such as having at least a portion of the article that is, but is not limited to, fluorescent, radioactive, reflective, flexible, stiff, pliable, breakable, or a combination thereof.

In a common vat printing process, a build platform is lowered from the top of the resin vat downwards by the layer thickness. Actinic radiation is directed into the composition and this light causing photopolymerization (photocuring) of the composition. The build platform continue to move downwards and additional layers are built upon the top of the previous layer. After completion, the vat may be drained of excess resin and the printed article collected. This printed article may be subjected to additional treatment. For example, the printed article may be washed to remove excess resin. As another example, particularly in the case where the article contains polyΔ1 and polyΔ2, the printed article may be exposed to thermal energy to cause thermal curing to occur.

A method of forming an article by vat polymerization may comprise directing actinic radiation to a vat of a photopolymerizable composition comprising monomers or macromers that are capable of undergoing polymerization, such as monomers or macromers that have functional groups capable of undergoing photopolymerization reactions to form oligomers and/or polymers, such as the polyhv compounds disclosed herein.

In one aspect, the vat polymerization, e.g. using SLA, is printing an article using a photopolymerizable composition, and directing actinic radiation to the vat of composition at light wavelength from about 10 nm to about 1 mm. As used herein, UV radiation has a wavelength of from about 10-400 nm, while visible radiation has a wavelength of 390-770 nm, and IR radiation has a wavelength of 770 nm-1 mm. In one aspect, the actinic radiation is comprised of one or more wavelengths and/or one or more radiations sources. In an aspect, the photopolymerizable composition may comprise a light reflective material component that causes photopolymerization to occur in a shorter exposure time than would occur without the light reflective material component under the same polymerization conditions. Optionally, if the curable composition contains thermally reactive components polyΔ1 and polyΔ2, a thermal curing process will be performed before, during, or after the photopolymerization process. Optionally, if the curable composition contains thermally reactive components polyΔ1 and polyΔ2, a thermal curing process will be performed after the photopolymerization process.

In one aspect, the present disclosure provides a method of printing an article using vat polymerization, e.g., SLA printing, in a device suitable for printing by SLA. The method includes providing a vat containing a curable composition as disclosed herein comprising at least one photoinitiator that absorbs at a wavelength of light from about 10 nm to about 770 nm. In an aspect, a photoinitiator absorbs at a wavelength of light of greater than or equal to 300 nm. In an aspect, a photoinitiator absorbs at a wavelength of light of greater than or equal to 365 nm. In an aspect, a photoinitiator absorbs at a wavelength of light of greater than or equal to 375 nm. In an aspect, a photoinitiator absorbs at a wavelength of light of greater than or equal to 400 nm. The photoinitiator in the curable composition is at least one photoinitiator component that comprises a photoinitiator that is a Type I, Type II, a cationic photoinitiator or a combination thereof.

In one aspect, the present disclosure provides a method of printing an article by vat polymerization, e.g., using SLA in a device for printing by SLA, where the method comprises photopolymerizing or curing a photopolymerizable composition at a depth of less than 150 microns. In an aspect, a method disclosed herein comprises photopolymerizing or curing a photopolymerizable composition at a depth of from about 5 microns to about 50 microns, and all depths thereinbetween.

In one aspect, the present disclosure provides a method of printing an article by vat polymerization, e.g., using SLA in a device for printing by SLA, where the method comprises photopolymerizable compositions comprising a light reflective material component comprising a light reflective material that is absorbable in physiological conditions. In an aspect, a light reflective material component comprises a light reflective material that is biocompatible for biological organisms. In an aspect, a light reflective material component comprises a light reflective material that polymerizes with at least one of a photopolymerizable macromer, a diluent, a light reflective material, or a combination thereof.

In one aspect, the present disclosure provides an additive manufacturing process comprising: (a) providing a vat containing a first composition as disclosed herein comprising polyEU and polySH; (b) directing actinic radiation from a light source into the first composition in the vat, where the actinic radiation is effective to induce polymerization of components of the composition so as to form a second composition; (c) forming a solid article comprising the second composition. The step (c) may be accomplished by repeatedly directing actinic radiation at the first composition in the vat, particularly as the build platform is moved. The second composition will be or comprise a photopolymerization product of polyEU and polySH.

In one aspect, the present disclosure provides an additive manufacturing process comprising: (a) providing a vat containing a first composition as disclosed herein containing polyhv, polyΔ1 and polyΔ2; (b) directing actinic radiation from a light source into the first composition in the vat, where the actinic radiation is effective to induce polymerization of photocurable components of the first composition so as to form a second composition comprising photochemically cured composition; and (c) applying thermal energy to the second composition comprising photochemically cured composition so as to form a third composition comprising photochemically cured composition and thermally cured composition. The second composition will be or comprise a photopolymerization product of polyhv. The third composition will be or comprise a double network of the photopolymerization product of polyhv in combination and the thermally induced polymerization product of polyΔ1 and polyΔ2.

In one aspect, the present disclosure provides a method of manufacturing an article by 2 photon polymerization printing, comprising curing a curable composition as disclosed herein to form the article. In one aspect, the present disclosure provides a method of manufacturing an article by computer axial lithography, comprising curing a curable composition as disclosed herein to form the article. In one aspect, the present disclosure provides a method of manufacturing an article by material extrusion comprising curing a curable composition as disclosed herein to form the article. In one aspect, the present disclosure provides a method of manufacturing an article by material jetting, comprising curing a curable composition as disclosed herein to form the article. In one aspect, the present disclosure provides a method of manufacturing an article by binder jetting, comprising curing a curable composition as disclosed herein to form the article. In one aspect, the present disclosure provides a method of manufacturing an article by continuous light interface production (CLIP), comprising curing a curable composition as disclosed herein to form the article. In one aspect, the present disclosure provides a method of manufacturing an article by vat polymerization, comprising curing a curable composition as disclosed herein to form the article.

Cured Compositions

The present disclosure comprises an article, additionally referred to herein as a printed article or a solid article, which may be made by the methods disclosed herein from the compositions disclosed herein. In an aspect, an article may be a medical device. In an aspect, an article may be a portion of a medical device. In an aspect, an article may be porous. In an aspect, an article may be biodegradable under physiological conditions. In an aspect, a biodegradable article may have a degradation time of about three days to about five years. In an aspect, an article may not be biodegradable. In an aspect, a portion of an article may be biodegradable and a second portion may be non-biodegradable or have a different degradation time from the degradation time of the first portion or the rest of the article.

As mentioned elsewhere, in one aspect, the cured composition does not contain any appreciable amount of water. For example, in aspects, the cured composition contains less than 2500 ppm water, or less than 1000 ppm water, or less than 500 ppm water.

In one aspect, the cured composition will degrade in water or when exposed to aqueous conditions. Thus, in one aspect, the cured composition may be biodegradable, which may be particularly useful when the cured composition is used to form a biodegradable implantable medical device. In one aspect, the cured composition degrades under aqueous conditions to form particulate material rather than, e.g., forming a swollen material, i.e., a material which has absorbed water and is in a swollen state. For example, when the cured composition is placed into a degradation media comprising water at a pH 7.0 to 7.4 phosphate buffer, or in phosphate buffer saline, the cured composition will undergo dissolution in the degradation media. Upon dissolution, such that greater than 50 wt %, or greater than 60 wt %, or greater than 70 wt %, or greater than 80 wt %, or greater than 90 wt % of the total weight of the cured composition has dissolved in the degradation media, the undissolved material will have a particular morphology rather than a swollen morphology.

In one aspect, the cured compositions of the present disclosure demonstrate desirably low swelling when placed in aqueous media. Swelling can be a serious problem when a cured composition is in prolonged contact with aqueous media. For example, when a cured composition is a component of, or all of, a biodegradable implantable medical device, and that device is implanted in a patient, the device may undergo both degradation (which is desirable) and swelling (which may be undesirable). Swelling may be a particular problem towards the end of the implant degradation, i.e., after most of the implant has degraded. However, the problem of swelling, particularly late stage swelling as may be observed after a majority of the implant has degraded (i.e., greater than 50% weight loss, or greater than 60% weight loss, or greater than 70% weight loss, or greater than 80% weight loss, or greater than 90% weight loss), can be mitigated by use of the curable compositions of the present disclosure.

The following are some exemplary embodiments of the present disclosure.

1) A composition comprising a first organic compound (polySH) having multiple thiol groups (SH), a second organic compound (polyEU) having multiple ethylenically unsaturated groups (EU), and a photoinitiator. A stabilizer may optionally be present in the composition, where the stabilizer may optionally be selected from the group consisting of tocopherol, gallic acid, ester of gallic acid, butylated hydroxyanisole and combinations thereof.
2) The composition of embodiment 1 or any embodiment of embodiment 1 as disclosed herein, for example embodiments 3-27, wherein the composition has an SH to EU equivalents ratio of X:Y, where X ranges from 25-75 and Y ranges from 75-25 and the sum of X and Y is 100.

3) The composition of embodiment 1 or any embodiment of embodiment 1 as disclosed herein, for example embodiment 2, wherein polySH is water soluble.

4) The composition of embodiment 1 or any embodiment of embodiment 1 as disclosed herein, for example embodiments 2 or 3, wherein polySH is bioabsorbable.

5) The composition of embodiment 1 or any embodiment of embodiment 1 as disclosed herein, for example embodiments 2 or 3 or 4, wherein polySH is a macromer.

6) The composition of embodiment 1 or any embodiment of embodiment 1 as disclosed herein, for example embodiments 2 or 3 or 4, wherein polySH is a macromer having a molecular weight of greater than 1,000 g/mol.

7) The composition of embodiment 1 or any embodiment of embodiment 1 as disclosed herein, for example embodiments 2 or 3 or 4, wherein polySH has a molecular weight of less than 500 g/mol.

8) The composition of embodiment 1 or any embodiment of embodiment 1 as disclosed herein, for example any of embodiments 2-7, wherein polyEU is water soluble.

9) The composition of embodiment 1 or any embodiment of embodiment 1 as disclosed herein, for example any of embodiments 2-8, wherein polyEU is bioabsorbable.

10) The composition of embodiment 1 or any embodiment of embodiment 1 as disclosed herein, for example embodiments 2-9 wherein EU of polyEU is acrylate.

11) The composition of embodiment 1 or any embodiment of embodiment 1 as disclosed herein, for example embodiments 2-9, wherein EU of polyEU is methacrylate.

12) The composition of embodiment 1 or any embodiment of embodiment 1 as disclosed herein, for example embodiments 2-9, wherein EU of polyEU is norbornenyl.

13) The composition of embodiment 1 or any embodiment of embodiment 1 as disclosed herein, for example embodiments 2-7, wherein polyEU is a macromer.

14) The composition of embodiment 1 or any embodiment of embodiment 1 as disclosed herein, for example embodiments 2-7, wherein polyEU is a macromer having a molecular weight of greater than 1,000 g/mol.

15) The composition of embodiment 1 or any embodiment of embodiment 1 as disclosed herein, for example embodiments 2-14, wherein at least one of polySH and polyEU further has multiple carbonyl groups, where optionally polyEU has multiple carbonyl groups, or where optionally polySH and polyEU each have multiple carbonyl group.

16) The composition of embodiment 1 or any embodiment of embodiment 1 as disclosed herein, for example embodiments 2-15, wherein at least one of polySH and polyEU further has multiple ester groups, where optionally polyEU has multiple ester groups, or where optionally polySH and polyEU each have multiple ester group.

17) The composition of embodiment 1 or any embodiment of embodiment 1 as disclosed herein, for example embodiments 2-15, wherein at least one polyEU and polySH further has multiple ester groups and multiple carbonate groups, where optionally polyEU has both multiple ester groups and multiple carbonate groups, or where optionally both of polySH and polyEU further have both multiple ester groups and multiple carbonate groups.

18) The composition of embodiment 1 or any embodiment of embodiment 1 as disclosed herein, for example embodiments 2-15, wherein at least one of polySH and polyEU further has multiple ester groups and multiple urethane groups, where optionally polyEU has both multiple ester groups and multiple urethane groups, or where optionally both of polySH and polyEU further have both multiple ester groups and multiple urethane groups.

19) The composition of embodiment 1 or any embodiment of embodiment 1 as disclosed herein, for example embodiments 2-15, wherein at least one of polySH and polyEU further has multiple carbonate groups and multiple urethane groups, where optionally polyEU has both multiple carbonate groups and multiple urethane groups, or where optionally both of polySH and polyEU further have both multiple carbonate groups and multiple urethane groups.

20) The composition of embodiment 1 or any embodiment of embodiment 1 as disclosed herein, for example embodiments 2-19, wherein the multiple SH of polySH is selected from 2, 3 and 4.

21) The composition of embodiment 1 or any embodiment of embodiment 1 as disclosed herein, for example embodiments 2-20, wherein the multiple EU of polyEU is selected from 2, 3 and 4.

22) The composition of embodiment 1 or any embodiment of embodiment 1 as disclosed herein, for example embodiments 2-21, which is free of volatile materials having a boiling point of less than 110° C.

23) The composition of embodiment 1 or any embodiment of embodiment 1 as disclosed herein, for example embodiments 2-22, which is anhydrous.

24) The composition of embodiment 1 or any embodiment of embodiment 1 as disclosed herein, for example embodiments 2-23, which is fluid at room temperature of about 18° C. to about 22° C.

25) A composition comprising a photochemically cured reaction product of the compositions of any of embodiments 1-24.

26) The composition of embodiment 25 which is bioabsorbable.

27) The composition of embodiment 25 which is a solid at 50° C.

28) An additive manufacturing process comprising:
  a. providing a vat containing a first composition of any one of embodiment 1-24;
  b. directing actinic radiation from a light source into the first composition in the vat, where the actinic radiation is effective to induce polymerization of components of the composition so as to form a second composition; and
  c. forming a solid article comprising the second composition.

29) A composition comprising a first organic compound (polyhv) having multiple photopolymerizable groups (hv), a photoinitiator, a second organic compound (polyΔ1) having multiple reactive groups Δ1, and a third organic compound (polyΔ2) having multiple reactive groups Δ2, where Δ1 reacts with Δ2 upon contact and exposure to a temperature of greater than 50° C.

30) The composition of embodiment 29 or any embodiment of embodiment 29, wherein polyhv is bioabsorbable.

31) The composition of embodiment 29 or any embodiment of embodiment 29, for example embodiment 30, wherein polyhv is a macromer.

32) The composition of embodiment 29 or any embodiment of embodiment 29, for example embodiment 30 or 31, wherein polyhv is a macromer having a molecular weight of greater than 1,000 g/mol.

33) The composition of embodiment 29 or any embodiment of embodiment 29, for example embodiment 30 or 31, wherein polyhv has a molecular weight of less than 500 g/mol.

34) The composition of embodiment 29 or any embodiment of embodiment 29, for example embodiment 30 or 31, wherein polyhv is water soluble.

35) The composition of embodiment 29 or any embodiment of embodiment 29, for example embodiment 30 to 34, wherein polyhv is polyEU elected from acrylate and methyacrylate.

36) The composition of embodiment 29 or any embodiment of embodiment 29, for example embodiment 30 to 34, wherein hv of polyhv is norbornenyl.

37) The composition of embodiment 29 or any embodiment of embodiment 29, for example embodiment 30 to 36, wherein Δ1 is a nucleophile and Δ2 is an electrophile.

38) The composition of embodiment 29 or any embodiment of embodiment 29, for example embodiment 30 to 36, wherein Δ1 is selected from hydroxyl and amino.

39) The composition of embodiment 29 or any embodiment of embodiment 29, for example embodiment 30 to 36, wherein Δ2 is selected from epoxide and isocyanate.

40) The composition of embodiment 29 or any embodiment of embodiment 29, for example embodiment 30 to 39, wherein at least one of polyhv, polyΔ1 and polyΔ2 further has multiple carbonyl groups, where optionally polyhv has multiple carbonyl groups, or where optionally polyhv and at least one of polyΔ1 and polyΔ2 has multiple carbonyl group.

41) The composition of embodiment 29 or any embodiment of embodiment 29, for example embodiment 30 to 39, wherein at least one of polyhv, polyΔ1 and polyΔ2 further has multiple ester groups, where optionally polyhv has multiple ester groups, or where optionally polyhv and at least one of polyΔ1 and polyΔ2 has multiple ester group.

42) The composition of embodiment 29 or any embodiment of embodiment 29, for example embodiment 30 to 39, wherein at least one polyhv, polyΔ1 and polyΔ2 further has multiple ester groups and multiple carbonate groups, where optionally polyhv has both multiple ester groups and multiple carbonate groups, or where optionally polyhv and at least one of polyΔ1 and polyΔ2 has both multiple ester groups and multiple carbonate groups.

43) The composition of embodiment 29 or any embodiment of embodiment 29, for example embodiment 30 to 39, wherein at least one of polyhv, polyΔ1 and polyΔ2 further has multiple ester groups and multiple urethane groups, where optionally polyhv has both multiple ester groups and multiple urethane groups, or where optionally polyhv and at least one of polyΔ1 and polyΔ2 has both multiple ester groups and multiple urethane groups.

44) The composition of embodiment 29 or any embodiment of embodiment 29, for example embodiment 30 to 39, wherein at least one of polyhv, polyΔ1 and polyΔ2 further has multiple carbonate groups and multiple urethane groups, where optionally polyhv has both multiple carbonate groups and multiple urethane groups, or where optionally polyhv and at least one of polyΔ1 and polyΔ2 has both multiple carbonate groups and multiple urethane groups.

45) The composition of embodiment 29 or any embodiment of embodiment 29, for example embodiment 30 to 44, wherein the multiple hv of polyhv is selected from 2, 3 and 4.

46) The composition of embodiment 29 or any embodiment of embodiment 29, for example embodiment 30 to 44, wherein the multiple Δ1 of polyΔ1 is selected from 2, 3 and 4.

47) The composition of embodiment 29 or any embodiment of embodiment 29, for example embodiment 30 to 44, wherein the multiple Δ2 of polyΔ2 is selected from 2, 3 and 4.

48) The composition of embodiment 29 or any embodiment of embodiment 29, for example embodiment 30 to 47, which is free of volatile materials having a boiling point of less than 110° C.

49) The composition of embodiment 29 or any embodiment of embodiment 29, for example embodiment 30 to 47, which is anhydrous.

50) The composition of embodiment 29 or any embodiment of embodiment 29, for example embodiment 30 to 47, which is fluid at a temperature of about 18° C. to about 22° C.

51) A composition comprising a photochemically cured reaction product and a thermally cured reaction product of the compositions of any of embodiments 29-50.

52) The composition of embodiment 51 which is bioabsorbable.

53) The composition of embodiment 51 which is a solid at 50° C.

54) An additive manufacturing process comprising:

a. providing a vat containing a first composition of any one of embodiments 29-50;

b. directing actinic radiation from a light source into the first composition in the vat, where the actinic radiation is effective to induce polymerization of components of the first composition so as to form a second composition comprising photochemically cured composition; and c. applying thermal energy to the second composition comprising photochemically cured composition so as to form a third composition comprising photochemically cured composition and thermally cured composition.

The disclosure has been described broadly and generically herein. Each of the narrower species and subgeneric groupings falling within the generic disclosure also form part of the disclosure. This includes the generic description of the disclosure with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the disclosure are described in terms of Markush groups, it is intended, and those skilled in the art will recognize, that the disclosure embraces and is also thereby described in terms of any individual member and any subgroup of members of the Markush group, and Applicants reserve the right to revise the application or claims to refer specifically to any individual member or any subgroup of members of the Markush group.

The following Examples are offered by way of illustration and not by way of limitation. Chemicals were obtained from commercial sources, e.g., MilliporeSigma (St. Louis, MO, USA).

EXAMPLES

Example 1

Hydroxyl Terminated Precursor Polymers

In one aspect, the present disclosure provides compositions that contain at least one of the compounds denoted as polyhv, polySH, polyEU, polyΔ1 and polyΔ2. Optionally, each of these compounds may be made from a precursor polymer having hydroxyl groups in lieu of the hv or SH or EU or Δ1 or Δ2 groups, where optionally the hv, SH, EU, Δ1 or Δ2 group is joined to the precursor polymer through a suitable linking group. The present Example illustrates the preparation of exemplary hydroxyl-containing precursor polymers.

Table 1 identifies 16 precursor polymers, uniquely labeled as 3DP 1 through 3DP 16, which may generally be described as having or including compounds of the general formula CC-[arm-OH] according to the present disclosure. The term arm-OH refers to an arm that terminates in a hydroxyl group (OH), i.e., has a hydroxyl end group.

When the precursor polymer includes compounds that include the formula CC-[(A)-(B)], i.e., when an arm is formed from residues of monomers from Group A (any one or more of trimethylene carbonate and ε-caprolactone) which are proximal to (adjacent to) the central core, and residues of monomers from Group B (any one or more of glycolide, lactide and p-dioxanone) which are the distal to (furthest away from) the central core, such precursor polymers may be prepared by reacting a functionalized central core, also referred to herein as an initiator, with one or more monomers from Group A, followed by reacting that reaction product (referred to herein as a precursor prepolymer) with one or more monomers from Group B. The result is a central core bonded to one or more arms, each arm being hydroxyl terminated and having the formula -(A)-(B)—OH. The preparation of such a precursor polymer is illustrated in Example 1A below, where the central core is trifunctional and the functionalized central core/initiator is provided by trimethylolpropane.

Example 1A—Preparation of Triaxial 3DP-6 Precursor Polymer

Trimethylene carbonate (1.4 mol) and ε-caprolactone (1.4 mol) were co-polymerized using trimethylolpropane (0.6 mol) as initiator and stannous octoate ($7.0\times10^{-5}$ mol) as catalyst, at 130° C. for 72 hours to provide a polymer precursor. Glycolide (1.1 mol) and additional stannous octoate ($2.1\times10^{-4}$ mol) were combined with the polymer precursor at 160° C. for 3 hours to provide a precursor polymer having polyglycolide grafts on the ends of the polymer precursor. The amorphous liquid precursor polymer, thus obtained, was devolatilized and characterized by $^{1}$H NMR spectroscopy, rheometry (viscosity 17,300 cP at shear rate 105 $s^{-1}$), differential scanning calorimetry (Tg=−45° C.) and gel permeation chromatography (Mn=1884 Da, PDI=1.80).

When the precursor polymer includes compounds that include the formula CC—[(B)-(A)], i.e., when residues of monomers from Group B (glycolide, lactide and p-dioxanone) are proximal to (adjacent to) the central core, and residues of monomers from Group A (trimethylene carbonate and caprolactone) are the distal to (furthest away from) the central core, such precursor polymers may be prepared by reacting a functionalized central core with one or more monomers from Group B, followed by reacting that reaction product with one or more monomers from Group A. The result is a central core bonded to one or more arms, each arm being hydroxyl terminated and having the formula -(B)-(A)-OH. The preparation of such a precursor polymer is illustrated in Example 1B below, where the central core is trifunctional and the functionalized central core is provided by trimethylolpropane.

Example 1B—Preparation of Triaxial 3DP-4 Precursor Polymer

In a first step, glycolide (1.1 mol) was polymerized with trimethylolpropane (0.6 mol) as initiator and stannous octoate ($7\times10^{-5}$ mol) as catalyst, at 160° C. for 3 hours to provide a polymer precursor. After completion of the first step, a mixture of equimolar amounts of trimethylene carbonate (1.4 mol) and ε-caprolactone (1.4 mol) was co-polymerized onto ends of the polymer precursor by adding more stannous octoate ($2\times10^{-4}$ mol) and reacting at 130° C. for 72 hours. The resulting amorphous liquid was devolatilized and characterized by $^{1}$H NMR spectroscopy, rheometry (viscosity 17,300 cP at shear rate 105 $s^{-1}$), differential scanning calorimetry (Tg=−45° C.) and gel permeation chromatography (Mn=1909 Da, PDI=1.83).

Following the procedures outlined in Examples 1A and 1B, additional polyester precursor polymers were synthesized as described in Table 1. All linear samples were synthesized with 1,3-propanediol as the bifunctional initiator, all trifunctional prepolymers were prepared with trimethylolpropane, and 4-arm block copolyester compositions were initiated by pentaerythritol as the tetrafunctional initiator. In Table 1, M/I refers to the total moles of monomers (M) used to prepare the arms divided by the moles of initiator (I) (also referred to as the functionalized central core) for each of the copolyesters identified in Table 1. Also in Table 1, M/C refers to the total moles of monomers (M) used to prepare the arms divided by the total moles of catalyst (C) used to prepare each of the copolyester prepolymers identified in Table 1. Each of the precursor polymers of Table 1 contains a B region, which is characterized in the column titled G/L/p-D, which is shorthand for Glycolide/Lactide/p-Dioxanone segment, and which may either be proximal to the central core (in which case the location of the B region is identified as being central to the precursor polymer) or it is distal to the central core (in which case the location of the B region is identified as being at the end of the precursor polymer, and in which case the B region terminates in a hydroxyl group).

Selected molecular weight results obtained by gel permeation chromatography (GPC) for selected precursor polymers prepared as illustrated in Example 1 are provided in Table 2. In Table 2, Mn refers to number average molecular weight, Mw refers to weight average molecular weight, PDI refers to polydispersity (i.e., Mw/Mn), and Da refers to Daltons.

TABLE 1

| Precursor polymer compositions | | | | | | | | | |
|---|---|---|---|---|---|---|---|---|---|
| Prepolymer | | | Initiator | | Composition (mol %) | | | | |
| Name | M/I | M/C | Type | G/L/p-D | Glycolide | TMC | Caprolactone | D,L-lactide | p-Dioxanone |
| 3DP 1 | 14.3 | 14,333 | Triaxial | Center | 2.3 | 48.8 | 48.8 | — | — |
| 3DP 2 | 7 | 14,333 | Triaxial | Center | 2.3 | 48.8 | 48.8 | — | — |
| 3DP 3 | 3.5 | 14,333 | Triaxial | Center | 2.3 | 48.8 | 48.8 | — | — |
| 3DP 4 | 7 | 14,000 | Triaxial | Center | 28.6 | 35.7 | 35.7 | — | — |
| 3DP 5 | 7 | 11,666 | Linear | Center | 14.3 | 42.9 | 42.9 | — | — |
| 3DP 6 | 7 | 14,000 | Triaxial | End | 28.6 | 35.7 | 35.7 | — | — |
| 3DP 7 | 7 | 11,666 | Linear | End | 14.3 | 42.9 | 42.9 | — | — |
| 3DP 8 | 7 | 14,000 | 4-arm | Center | 42.9 | 28.6 | 28.6 | — | — |
| 3DP 9 | 7 | 14,000 | Triaxial | End | 50 | 25 | 25 | — | — |
| 3DP 10 | 7 | 11,666 | Linear | End | 25 | 37.5 | 37.5 | — | — |
| 3DP 11 | 7 | 14,000 | Triaxial | End | 75 | 12.5 | 12.5 | — | — |
| 3DP 12 | 7 | 11,666 | Linear | End | 50 | 25 | 25 | — | — |
| 3DP 13 | 7 | 14,000 | Triaxial | End | — | 25 | 25 | 50 | — |
| 3DP 14 | 7 | 14,000 | Triaxial | End | — | 25 | 25 | — | 50 |
| 3DP 15 | 7 | 11,666 | Linear | End | — | 37.5 | 37.5 | 25 | — |
| 3DP 16 | 7 | 11,666 | Linear | End | — | 37.5 | 37.5 | — | 25 |
| 3DP 19 | 7 | 11,666 | Linear | End | 20-40 | 15-35 | 40-60 | — | — |
| 3DP 20 | 7 | 11,666 | Linear | End | 20-40 | 10-30 | 45-70 | — | — |

TABLE 2

| 3DP molecular weights (Mn and Mw) and polydispersity indices (PDI) | | | |
|---|---|---|---|
| Precursor polymer Name | Mn (Da) | Mw (Da) | PDI |
| 3DP 4 | 1909 ± 29 | 3490 ± 16 | 1.83 ± 0.03 |
| 3DP 5 | 2311 ± 23 | 3766 ± 18 | 1.63 ± 0.02 |
| 3DP 6 | 1884 ± 15 | 3386 ± 36 | 1.79 ± 0.02 |
| 3DP 7 | 2168 ± 141 | 3628 ± 87 | 1.68 ± 0.08 |
| 3DP 9 | 1554 ± 37 | 2569 ± 29 | 1.65 ± 0.03 |
| 3DP 10 | 1785 ± 30 | 2208 ± 73 | 1.24 ± 0.02 |
| 3DP 11 | 1389 ± 8 | 1829 ± 9 | 1.32 ± 0.01 |
| 3DP 12 | 1606 ± 5 | 2410 ± 17 | 1.50 ± 0.01 |
| 3DP 19 | 1837 ± 15 | 2936 ± 23 | 1.59 ± 0.02 |
| 3DP 20 | 1881 ± 37 | 2902 ± 22 | 1.54 ± 0.05 |

Example 2

Preparation of Methacrylated Compounds of the Present Disclosure Exemplary Polymer of Formula PolyEU Table 3 identifies 8 EU-functionalized precursor polymers, uniquely labeled as 3DP 4m (m standing for methacrylate, which is an exemplary ethylenically unsaturated (EU) group) through 3DP 7m and 3DP 9m through 3DP 12m, which may generally be described as having or including compounds of the general formula CC-[arm-EU] according to the present disclosure. The designation arm-EU refers to an arm that terminates in a light-reactive ethylenically unsaturated group, such as an acrylate ("a") or methacrylate ("m") group.

The methacrylated polymers of Table 3 were prepared from the corresponding precursor polymers of Table 1, that is, 3DP 4m was prepared from 3DP 4, 3DP 5m was prepared from 3DP 5, etc.

Methacrylation of 3DP 6 to Form 3DP 6m

The 3DP 6 precursor polymer (0.131 moles) was reacted with an excess of methacrylic anhydride, in the presence of 3-tert-2-butyl-4-hydroxyanisole ($6.724\times10^{-4}$ moles), at 120° C. for 24 hours. Residual methacrylic anhydride and methacrylic acid by-products were removed from the crude polymer using a rotary evaporator. The resulting amorphous liquid polymer was characterized using $^1$H NMR spectroscopy, rheometery (viscosity 16,400 cP at shear rate 105 $s^{-1}$), differential scanning calorimetry (Tg=−38° C.) and gel permeation chromatography (Mn=2162 Da, PDI=1.75). Each 3DP formulation was methacrylated following the procedure outlined above. The composition and molecular weight results are outlined in Table 3, and the dynamic viscosities are reported in Table 4. In Table 3, for 3DP 5m, 40.15 in the TMC column is the total mole % of TMC plus 1,3-propanediol used to make 3DP 5m.

TABLE 3

| Composition and molecular weight results of methacrylated 3DP formulations | | | | | | | |
|---|---|---|---|---|---|---|---|
| Polymer | Composition (mol %) | | | | | | |
| Name | Glycolide | TMC | Caprolactone | Methacrylate | Mn | Mw | PDI |
| 3DP 4m | 19.91 | 28.43 | 24.66 | 27.00 | — | — | — |
| 3DP 5m | 9.93 | 40.15 | 32.87 | 17.05 | 2648 ± 82 | 3999 ± 56 | 1.51 ± 0.03 |
| 3DP 6m | 19.94 | 24.36 | 28.87 | 27.43 | 2162 ± 14 | 3793 ± 24 | 1.75 ± 0.02 |
| 3DP 7m | 9.89 | 39.38* | 32.52 | 18.21 | 2328 ± 32 | 3551 ± 14 | 1.53 ± 0.02 |
| 3DP 9m | 35.06 | 15.51 | 22.16 | 27.87 | 1585 ± 55 | 2946 ± 52 | 1.86 ± 0..03 |
| 3DP 10m | 17.3 | 36.97* | 27.78 | 17.95 | 2140 ± 11 | 2548 ± 13 | 1.19 ± 0.004 |
| 3DP 11m | 50.23 | 9.34 | 13.60 | 26.83 | 2125 ± 4 | 2575 ± 6 | 1.21 ± 0.003 |
| 3DP 12m | 32.02 | 26.00* | 20.98 | 21.01 | 1670 ± 8 | 2588 ± 12 | 1.55 ± 0.01 |
| 3DP 19m | — | — | — | — | 1826 ± 13 | 3009 ± 29 | 1.64 ± 0.01 |
| 3DP 20m | — | — | — | — | 1984 ± 12 | 3022 ± 6 | 1.5 ± 0.09 |

TABLE 4

| Dynamic viscosity of methacrylated 3DP polymers | |
|---|---|
| Polymer Name | Viscosity at 105 $s^{-1}$ shear rate (cP) |
| 3DP 4 m | 12,700 ± 141 |
| 3DP 5 m | 6,747 ± 35 |
| 3DP 6 m | 16,400 ± 346 |
| 3DP 7 m | 5,493 ± 38 |
| 3DP 19 m | 6555 ± 216 |
| 3DP 20 m | 3262 ± 26 |

Example 3

Preparation of Thiolated Compound of the Present Disclosure Exemplary Polymers of Formula PolySH A 500 mL 3-neck round bottomed flask equipped with a mechanical stirrer and an addition funnel was charged with 3DP 6 (51.3 g; 0.0665 moles; see Table 1), thiolactic acid (17.243 mL; 20.623 g; 0.1943 moles) and dichloromethane (DCM) (200 mL) in a nitrogen environment. The contents of the reaction vessel were stirred at 200 rpm and the reaction vessel was cooled using an ice bath. Separately, N,N'-dicyclohexylcarbodiimide (DCC) (44.5 g, 0.2157 moles) was dissolved in 200 mL DCM. The DCC in DCM solution was then added to the reaction vessel drop wise using an addition funnel over a period of 30 minutes. After the addition of DCC/DCM solution had been completed, ice bath was removed. 4-Dimethylaminopyridine (DMAP) (2.366 g; 0.0193 moles) was added to the reaction vessel using a powder funnel. The reaction mixture was continued to stir in nitrogen environment at room temperature for 72 hours. DCM levels were replenished as it evaporated during the reaction. After 72 hours, the reaction mixture was filtered under suction. The filtrate was washed with 2×100 mL 0.25 M HCl and 1×100 mL deionized (DI) water. The organic phase from the extraction was dried over activated molecular sieves (3 Å) for 18 hours after which it was filtered under suction. The solvent was removed under vacuum on a rotary evaporator to get a liquid polymeric product (3DP 6t, where "t" indicates thiolated, also referred to herein as a polySH polymer). The amorphous liquid polymer, thus obtained, was characterized by $^{1}$H NMR spectroscopy, rheometry (viscosity=7690 at shear rate of 99 $s^{-1}$), and gel permeation chromatography (Mn=1952 Da, PDI=1.62). The table below outlines other thiolated 3DP compounds with n-acetyl cysteine (NAC), thiolactic acid (TLA), and thioglycolic acid (TGA). Each of these were synthesized based on this exemplary synthesis procedure.

TABLE 5

Properties of Thiolated 3DP Polymers

| Polymer Name | Composition (mol %) Glycolide | TMC | Caprolactone | Thiol | Viscosity at 100 $s^{-1}$ shear rate (cP) | Mn | Mw | PDI |
|---|---|---|---|---|---|---|---|---|
| 3DP 6t (TLA) | 22.14 | 27.64 | 27.64 | 22.59 | 7690 | 2380 | 4579 | 1.92 |
| 3DP 6t (NAC) | 17.10 | 21.34 | 21.34 | 40.22 | 116,921 | 1952 | 3162 | 1.62 |
| 3DP 10t (NAC) | 16.89 | 25.33 | 25.33 | 32.45 | 42,592 | 2213 | 3629 | 1.64 |
| 3DP 19t (TLA) | 20.74 | 18.66 | 43.55 | 17.05 | 5295 | 2071 | 3165 | 1.54 |
| 3DP 19t (TGA) | 21.32 | 19.18 | 44.17 | 14.74 | 5904 | 2202 | 3487 | 1.58 |
| 3DP 20t (TGA) | 21.34 | 12.81 | 51.22 | 14.63 | 4461 | 2109 | 3052 | 1.45 |

Example 4

Preparation of Thiolated Compound of the Present Disclosure Generally Described by the Formula PolySH Polymers which have hydroxyl groups can be capped with a moiety that replaces the hydroxyl group with a carboxylic acid group. The carboxylic acid groups can then be substituted with a thiol containing moiety via an amide or ester bond depending on the functional unit of the substituent employed for bonding. For instance, the hydroxyl end groups of a 3DP precursor polymer (see, e.g., Table 1) can be reacted with succinic anhydride to form a succinated intermediate (3DP-SA), which may in turn be reacted with the amine group present in cysteine to provide a product (3DP 6-SA-Cys) having terminal free thiol groups, which provide exemplary polySH compounds of the present disclosure. This approach is illustrated by the present example.

Part 1—formation of 3DP 6-SA: A 250 mL 3-neck round bottomed flask was charged with 3DP 6 (48.9 g; 0.0633 moles, Table 1). The system was placed under vacuum (<0.5 torr) at 40° C. for 18 hours to dry the pre-polymer. After 18 hours, the system was purged with nitrogen and succinic anhydride (19.0 g; 0.1900 moles) was added to the reaction vessel. The reaction mixture was stirred at 50 rpm at 120° C. for 24 hours. The polymer thus obtained was cooled to room temperature and devolatilized on rotary evaporator to remove residual monomer at room temperature for 18 hours and further 24 hours at 110° C. The structure of the resulting clear amorphous polymer product was confirmed using 1H NMR.

Part 2—formation of 3DP 6-SA-Cys: A 100 mL 2-neck flask was charged with 3DP 6-SA (10.1 g; 0.0093 moles), L-cysteine (3.39 g; 0.0280 moles) and dichloromethane (DCM) (30 mL). The reactants were stirred at 200 rpm in nitrogen environment. Separately, N'-dicyclohexylcarbodiimide (DCC) (6.35 g, 0.0307 moles) was dissolved in 10 mL DCM. An ice bath was placed around the reaction vessel and DCC/DCM solution was added dropwise. The ice bath was removed after the addition of DCC/DCM solution had been completed and the reactants were allowed to stir at room temperature for 72 hours in nitrogen environment. After 72 hours, the reaction mixture was diluted with 50 mL DCM and filtered under suction. The filtrate was washed with 2×50 mL 0.25 M HCl and 1×50 mL DI water. The organic phase from the extraction was dried over activated molecular sieves (3 Å) for 18 hours after which it was filtered under suction. The solvent was removed under vacuum on a rotary evaporated to provide a waxy polymeric product (3DP 6-SA-Cys), the structure of which was confirmed by 1H NMR spectroscopy.

Example 5

Single Polymeric Network from polyEU and polySH

Thiol terminated 3DP polymers were mixed with methacrylated 3DP polymers in two different ratios. TPO-L photoinitiator was added to each combination at a concentration of 0.5% (w/w) and the formulation was mixed on a Flacktek high speed mixer for 2 minutes at 2000 rpm followed by 3 minutes at 3000 rpm. The formulation was cured into a film with 0.75 mm thickness. Films were cut into 75 mm×7.5 mm×0.75 mm specimens subjected to accelerated degradation at 50° C. in pH 7.4 phosphate buffer. In FIG. 1, the degradation profiles of 50:50 and 25:75 3DP 6t TLA/3DP 10m films are shown. The information in FIG. 1 shows the effect of water swelling for polyEU/polySH single polymeric networks.

Example 6

Preparation of Isocyanate Terminated Compounds of the Present Disclosure Exemplary Polymers of Formula PolyA As mentioned in Example 1, hydroxyl-terminated polymers may provide precursor compounds to polyΔ compounds of the present disclosure. Hydroxyl groups may be converted to thermally reactive groups, e.g., isocyanate group as shown by the present example, which illustrates diisocyanate capping of 3DP 10

A 250 mL 3-neck round bottomed flask equipped with a mechanical stirrer and an addition funnel was charged with 3DP 10 (76.7 g; 0.0996 moles). The 3DP 10 was dried at 40° C. under reduced pressure for 3 days. After drying, the flask was purged with dry nitrogen, and agitation was started at 220 rpms. The flask was charged with 15 ml of anhydrous toluene and hexamethylene diisocyante (HMDI; 33.5 ml; 0.209 moles). The reaction mixture temperature was increased to 80° C. for 2 hours and then allowed to return to room temperature. The polymer mixture was then transfer to a 1-neck flask and placed on a rotary evaporator. The residual toluene and HMDI were removed under reduced pressure on the rotary evaporator. The amorphous liquid polymer, thus obtained was characterized by $H^1$ NMR spectroscopy (Polymer—70.3 wt % Isocyanate—29.6 wt. %).

Example 7

Double Polymeric Network from polyEU and PolyΔ1+PolyΔ2

Double network films were prepared with a photopolymerized methacrylate polymer network and a thermally cured interpenetrating polymer network. 3DP 12m and 3DP 6 precursor polymer (an exemplary polyΔ1) were mixed in either a 50:50 or 70:30 ratio. TPO-L photoinitiator was added to the mixture at a 0.5% (w/w) concentration with respect to the weight of the methacrylated polymer. Hexamethylenediisocynate (an exemplary polyΔ2) was added the mixture at a 45% of the number of moles of hydroxyl groups in the precursor polymer (3:1 OH:polymer in case of 3DP6, a triaxial polymer). The formulation was mixed using a Flacktek high speed mixer for 2 minutes at 2000 rpm followed by 2 minutes at 3000 rpm. The formulation was then cured as a film of 0.75 mm thickness for 10 minutes under UV light at an intensity of 30 mW/cm2. The photocured film was further cured thermally at 100° C. for 1 hour.

Figure 2:
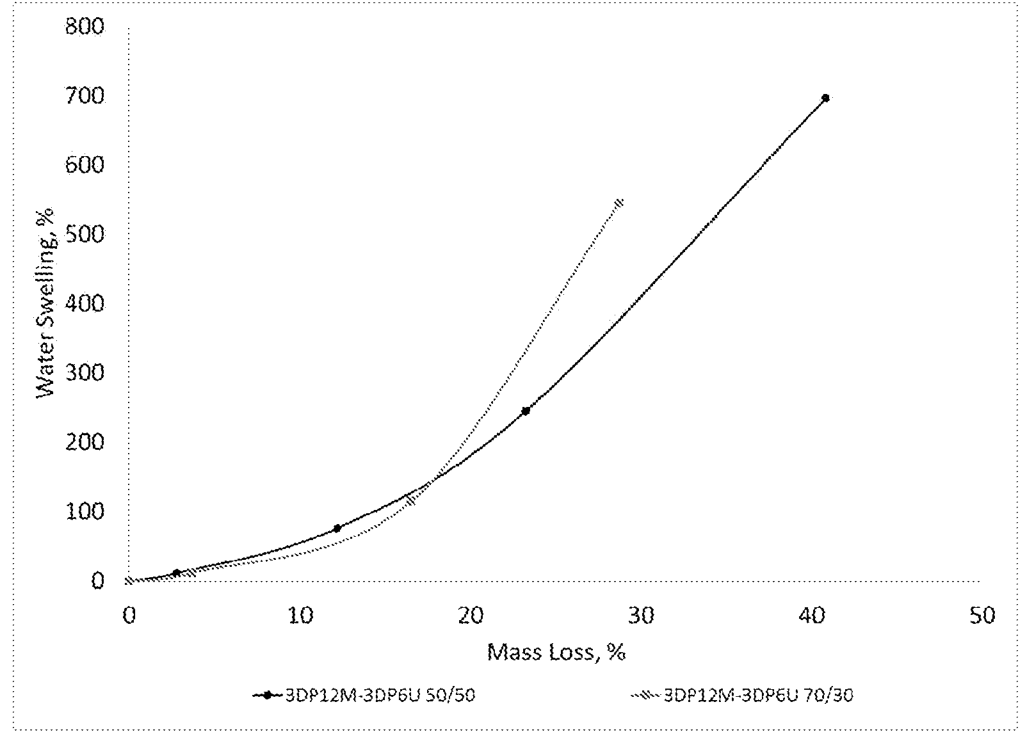
FIG. 2 shows water swelling profiles for selected cured compositions of the present disclosure.

The film was cut up into test strips of 75 mm×7.5 mm×0.75 mm and subjected to accelerated degradation at 50° C. in pH 7.4 phosphate buffer. Mass loss, water content and mechanical properties of the material were analyzed at different timepoints during the study. The results are shown in FIG. 2. In FIG. 2, the data show the water swelling behavior for urethane and methacrylated polyester double networks. The addition of the urethane network increases the water swelling up to 25-30% mass loss. After 25-30% mass loss, both the 50:50 3DP12m:3DP 6U and 3DP6u showed substantially less swelling.

Example 8

Mechanics of Poly(SH) and Poly(EU) Materials

To evaluate the properties of crosslinked 3DP polymer blends, tensile specimens were created for mechanical testing. For any particular polymer blend, a thiol-terminated 3DP polymer was mixed with one or more methacrylated 3DP polymers (3DPX M) in 25:75 and 50:50 weight ratios where the thiolated polymer was synthesized using thiolactic acid (3DPX TLA), N-acetyl-L-cysteine (3DPX NAC), or thioglycolic acid (3DPX TGA) as described in Example 3. In addition to methacrylated 3DP polymers, select blends at similar ratios were studied with a diluent component of poly-ethylene glycol diacrylate (PEGDA). A photoinitiator, ethyl (2,4,6-trimethylbenzoyl) phenyl phosphinate (TPOL), was added at 0.5% (w/w) and the blend was mixed on a FlackTek high speed mixer for two minutes at 2000 rotations per minute (rpm) followed by three minutes at 3000 rpm.

Each liquid polymer blend was poured between two UV-transparent acrylic sheets with 0.75 mm spacers and cured under a 100 W UV Blak-Ray lamp for 10 minutes. The crosslinked film was removed and cut into tensile specimens with dimensions of 0.75×7.5×75 mm. The film strips were subjected to mechanical testing on an MTS test frame to evaluate their tensile properties with at least four strips for each blend tested. The test parameters for tensile testing are presented in Table 6. The polymer blends studied and their corresponding tensile properties are reported in Table 7.

TABLE 6

| Testing Parameters | | | |
|---|---|---|---|
| | Parameter | Value | Units |
| Test Inputs | Break sensitivity | 90 | % |
| | Break threshold | 0.5 | lbf |
| | Data acquisition rate | 70 | Hz |
| | Test speed | 2.5 | mm/min |
| Calculation Inputs | Break marker drop | 50 | % |
| | Break marker elongation | 0.1 | Inch |
| | Grip separation | 1 | Inch |
| | Slack pre-load | 1 | lbf |
| | Slope segment length | 20 | % |
| | Yield offset | 0.2 | % |
| | Yield segment length | 2 | % |

TABLE 7

Poly(SH) and Poly(EU) Photopolymerized Tensile Mechanics

| | Peak Stress (kPa) | Strain at Break (%) | Modulus (MPa) |
|---|---|---|---|
| 3DP6 M | 29340 | 38 | 352 |
| 25:75 3DP6t TLA:3DP6 M | 4020 | 23 | 23 |
| 50:50 3DP6t TLA:3DP6 M | 750 | 19 | 4 |
| 3DP10 M | 5950 | 31 | 21 |
| PEGDA 575 | 4780 | 15 | 34 |
| 25:75 3DP6t TLA:PEGDA 575 | 1900 | 14 | 15 |
| 50:50 3DP6t TLA:PEGDA 575 | 800 | 13 | 7 |
| 25:75 3DP6t TLA:3DP10 M | 1370 | 28 | 6 |
| 50:50 3DP6t TLA:3DP10 M | 450 | 30 | 2 |
| 3DP19 M | 6630 | 34 | 29 |
| 3DP20 M | 6430 | 41 | 21 |
| 50:50 3DP19t TLA:3DP20 M | 400 | 40 | 1 |
| 50:50 3DP19t TGA:3DP20 M | 530 | 65 | 2 |

Example 9

Stability of Poly(SH) and Poly(EU) Compositions

Part 1—Polymer blends with and without stabilizers were investigated for premature crosslinking. A thiol terminated photo-reactive compound was mixed with a methacrylated photo-reactive compound at a 50:50 ratio. Prospective stabilizing compounds were each added to an aliquot of the reactive mixture at varying concentrations. Each formulation blend was mixed on a FlakTek high speed mixer for two minutes at 2000 rotations per minute (rpm) followed by three minutes at 3000 rpm. An aliquot of each blend was transferred to a petri dish and stored at room temperature (RT) or 50° C. The stability of the polymer blends were qualitatively evaluated by the solidification of the blend and the results are reported in table 8.

TABLE 8

Stability of methacrylate and thiol terminated photo-reactive resins

| Photo-reactive blends (50:50) | Stabilizer | Concentration (ppm) | Storage time (hr) | Storage temp | Solidification (Yes/No) |
|---|---|---|---|---|---|
| 3DP 19 m:3DP 19t TLA | Citric acid | 5000 | 16 | RT | Y |
| 3DP 19 m:3DP 19t TLA | Succinic acid | 5200 | 96 | RT | Y |
| 3DP 19 m:3DP 19t TLA | Adipic acid | 1000 | 48 | RT | Y |
| TMPTM:TMPTT* | Phosphoric acid | 500 | 48 | 50° C. | N |
| 3DP 20 m:3DP 19t TGA | Lauryl gallate | 9000 | 24 | RT | N |
| 3DP 20 m:3DP 19t TGA | Tocopherol | 12000 | 24 | RT | N |
| 3DP 20 m:3DP 19t TGA | Gallic acid | 4000 | 24 | RT | N |
| 3DP 20 m:3DP 19t TGA | Triphenylphosphite | 9500 | 24 | RT | N |
| 3DP 20 m:3DP 19t TGA | Phenylphosphonic acid | 4000 | 24 | RT | N |

*TMPTM: Trimethylolpropane trimethacrylate; TMPTT: Trimethylolpropane tris(3-mercaptopropionate)

Part 2—A thiol-terminated polymer (3DP 19t TGA) was mixed with a methacrylated polymer (3DP 20m) at a 50:50 weight ratio. Selected stabilizers were each added to an aliquot of the liquid polymer blend and the viscosity of the formulations were evaluated by rheometry (25° C. at shear rate 100 $s^{-1}$) at 24 hours to yield a quantitative measurement of stability. The initial viscosity of the resin without a stabilizer was 3920±20 cP. Viscosities of stabilized polymer blends at 24 hours of storage at room temperature are provided in table 9.

TABLE 9

Viscosity of stabilized 3DP 19t TGA and 3DP 20 m blend after 24 hours of storage

| Stabilizer in polymer blends | Concentration (ppm) | Viscosity at 24 hours Viscosity (cP) | Increase (%) |
|---|---|---|---|
| No stabilizer | — | Solidified | — |
| Ascorbic acid | 4400 | Solidified | — |
| BHA | 4500 | 4044 | 3.2 |
| BHT | 5400 | 8797 | 124 |

TABLE 9-continued

| Viscosity of stabilized 3DP 19t TGA and 3DP 20 m blend after 24 hours of storage | | | |
|---|---|---|---|
| Stabilizer in polymer blends | Concentration (ppm) | Viscosity at 24 hours Viscosity (cP) | Increase (%) |
| Lauryl gallate | 8700 | 3940 | 0.5 |
| Gallic acid | 5200 | 4056 | 3.5 |
| Tocopherol | 1000 | 4021 | 2.6 |
| Tocopherol | 10000 | 4113 | 4.9 |
| Tocopherol | 100000 | 3769 | −3.9 |
| Triphenyl phosphite | 10000 | 4046 | 3.2 |

All references disclosed herein, including patent references and non-patent references, are hereby incorporated by reference in their entirety as if each was incorporated individually.

It is to be understood that the terminology used herein is for the purpose of describing specific embodiments only and is not intended to be limiting. It is further to be understood that unless specifically defined herein, the terminology used herein is to be given its traditional meaning as known in the relevant art.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents, i.e., one or more, unless the content and context clearly dictates otherwise. It should also be noted that the conjunctive terms, "and" and "or" are generally employed in the broadest sense to include "and/or" unless the content and context clearly dictates inclusivity or exclusivity as the case may be. Thus, the use of the alternative (e.g., "or") should be understood to mean either one, both, or any combination thereof of the alternatives. In addition, the composition of "and" and "or" when recited herein as "and/or" is intended to encompass an embodiment that includes all of the associated items or ideas and one or more other alternative embodiments that include fewer than all of the associated items or ideas.

Unless the context requires otherwise, throughout the specification and claims that follow, the word "comprise" and synonyms and variants thereof such as "have" and "include", as well as variations thereof such as "comprises" and "comprising" are to be construed in an open, inclusive sense, e.g., "including, but not limited to." The term "consisting essentially of" limits the scope of a claim to the specified materials or steps, or to those that do not materially affect the basic and novel characteristics of the claimed disclosure. In case of conflict, the present specification, including explanations of terms, will control. In addition, all the materials, methods, and examples are illustrative and not intended to be limiting.

Any headings used within this document are only being utilized to expedite its review by the reader, and should not be construed as limiting the disclosure or claims in any manner. Thus, the headings and Abstract of the Disclosure provided herein are for convenience only and do not interpret the scope or meaning of the embodiments.

Where a range of values is provided herein, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either or both of those included limits are also included in the disclosure.

For example, any concentration range, percentage range, ratio range, or integer range provided herein is to be understood to include the value of any integer within the recited range and, when appropriate, fractions thereof (such as one tenth and one hundredth of an integer), unless otherwise indicated. Also, any number range recited herein relating to any physical feature, such as polymer subunits, size or thickness, are to be understood to include any integer within the recited range, unless otherwise indicated. As used herein, the term "about" means±20% of the indicated range, value, or structure, unless otherwise indicated.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Such documents may be incorporated by reference for the purpose of describing and disclosing, for example, materials and methodologies described in the publications, which might be used in connection with the presently described disclosure. The publications discussed above and throughout the text are provided solely for their disclosure prior to the filing date of the present application. Nothing herein is to be construed as an admission that the inventors are not entitled to antedate any referenced publication by virtue of prior disclosure.

All patents, publications, scientific articles, web sites, and other documents and materials referenced or mentioned herein are indicative of the levels of skill of those skilled in the art to which the disclosure pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Furthermore, the written description portion of this patent includes all claims. Furthermore, all claims, including all original claims as well as all claims from any and all priority documents, are hereby incorporated by reference in their entirety into the written description portion of the specification, and Applicants reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

Other nonlimiting embodiments are within the following claims. The patent may not be interpreted to be limited to the specific examples or nonlimiting embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

What is claimed is:

1. A composition comprising:

a first organic compound (polySH) having multiple thiol groups (SH), wherein the first organic compound is bioabsorbable, and wherein polySH is a macromer;

a second organic compound (polyEU) having multiple ethylenically unsaturated groups (EU), wherein the second organic compound is bioabsorbable, and wherein polyEU is a macromer;

having an SH to EU equivalents ratio of X:Y, where X ranges from 25-75 and Y ranges from 75-25 and the sum of X and Y is 100;

a photoinitiator, wherein the photoinitiator is in a total concentration of less than 1.0 wt %; and optionally a stabilizer;

wherein the composition is bioabsorbable; and wherein the composition is substantially free of monomers.

2. The composition of claim 1 wherein EU of polyEU is acrylate, methacrylate or norbornenyl.

3. The composition of claim 1 wherein at least one polyEU and polySH further has multiple ester groups and multiple carbonate groups, where optionally polyEU has both multiple ester groups and multiple carbonate groups, or where optionally both of polySH and polyEU further have both multiple ester groups and multiple carbonate groups.

4. The composition of claim 1 wherein at least one of polySH and polyEU further has multiple carbonate groups and multiple urethane groups, where optionally polyEU has both multiple carbonate groups and multiple urethane groups, or where optionally both of polySH and polyEU further have both multiple carbonate groups and multiple urethane groups.

5. The composition of claim 1 which is free of volatile materials having a boiling point of less than 110° C.

6. A composition comprising a photochemically cured reaction product of the composition of claim 1.

7. The composition of claim 6 which is a solid at 50° C.

8. An additive manufacturing process comprising:

(a) providing a vat containing a first composition of claim 1;

(b) directing actinic radiation from a light source into the first composition in the vat, where the actinic radiation is effective to induce polymerization of components of the composition so as to form a second composition; and (c) forming a solid article comprising the second composition.

9. The composition of claim 1, wherein polySH is water soluble.

10. The composition of claim 1, wherein polySH has a molecular weight of greater than 1,000 g/mol.

11. The composition of claim 1, wherein polyEU is water soluble.

12. The composition of claim 1, wherein polyEU has a molecular weight of greater than 1,000 g/mol.

13. The composition of claim 1, wherein the multiple SH of polySH is selected from 2, 3, and 4.

14. The composition of claim 1, wherein the multiple EU of polyEU is selected from 2, 3, and 4.

15. The composition of claim 1, wherein the composition is anhydrous.

16. The composition of claim 1, wherein the composition is fluid at a temperature of from 18° C. to 22° C.

* * * * *